(12) United States Patent
Kimura

(10) Patent No.: US 12,103,094 B2
(45) Date of Patent: Oct. 1, 2024

(54) HYDRAULIC ACTUATION DEVICE

(71) Applicant: Ogura & Co., Ltd., Kanagawa (JP)

(72) Inventor: Kiyoshi Kimura, Ebina (JP)

(73) Assignee: OGURA & CO., LTD., Kanagawa (JP)

( * ) Notice: Subject to any disclaimer, the term of this patent is extended or adjusted under 35 U.S.C. 154(b) by 279 days.

(21) Appl. No.: 17/775,013

(22) PCT Filed: Nov. 11, 2019

(86) PCT No.: PCT/JP2019/044151
§ 371 (c)(1),
(2) Date: May 6, 2022

(87) PCT Pub. No.: WO2021/095098
PCT Pub. Date: May 20, 2021

(65) Prior Publication Data
US 2022/0388079 A1    Dec. 8, 2022

(51) Int. Cl.
*B23D 17/06* (2006.01)
*B25F 5/02* (2006.01)
*A62B 3/00* (2006.01)

(52) U.S. Cl.
CPC ............... *B23D 17/06* (2013.01); *B25F 5/02* (2013.01); *A62B 3/005* (2013.01)

(58) Field of Classification Search
CPC ........ B23D 17/06; B23D 15/14; B23D 29/00; B25F 5/02; A62B 3/005; F15B 2211/30;
(Continued)

(56) References Cited

U.S. PATENT DOCUMENTS 3,819,153 A    6/1974   Hurst et al.
3,973,594 A *  8/1976   Gustafsson ........... F16K 11/207
                                                    137/637
(Continued)

FOREIGN PATENT DOCUMENTS

CN    109773723    5/2019
JP    S60-20822 A  2/1985
(Continued)

OTHER PUBLICATIONS

ISR for PCT/JP2019/044151, dated Jan. 21, 2020.
(Continued)

*Primary Examiner* — Evan H Macfarlane
*Assistant Examiner* — Liang Dong
(74) *Attorney, Agent, or Firm* — Greenblum & Bernstein, P.L.C.

(57) ABSTRACT

A hydraulic actuation device includes a tool, an actuation part having a pressure oil supply mechanism configured to send pressure oil from an oil chamber to the tool and return return oil from the tool to the oil chamber, an operation handle for adjusting oil passages for the pressure oil and the return oil in the pressure oil supply mechanism and configured to be able to be moved from an initial position, and biasing means configured to bias the operation handle toward the initial position when no external force is applied to the operation handle. When the operation handle moves from the initial position, the tool is actuated by the actuation part. When the operation handle is returned to the initial position by the biasing means, operation of the tool by the actuation part is stopped.

6 Claims, 15 Drawing Sheets

(58) Field of Classification Search
CPC ........ F02D 29/04; F16K 11/14; F16K 11/163; Y10T 137/87096
See application file for complete search history.

(56) References Cited

U.S. PATENT DOCUMENTS

| | | | |
|---|---|---|---|
| 4,369,576 | A | 1/1983 | McVaugh |
| 5,243,761 | A | 9/1993 | Sullivan et al. |
| 2005/0223886 | A1* | 10/2005 | Oide ................. B23D 17/06 91/428 |
| 2014/0034149 | A1 | 2/2014 | Kimura |
| 2015/0219227 | A1* | 8/2015 | Risla ................. F16K 31/52458 137/513 |
| 2019/0145434 | A1 | 5/2019 | Kimura |

FOREIGN PATENT DOCUMENTS

| | | |
|---|---|---|
| JP | 11-247806 | 9/1999 |
| JP | 2004-17202 A | 1/2004 |
| JP | 2012-225397 A | 11/2012 |

OTHER PUBLICATIONS

Search Report issued in Corresponding CN Patent Application No. 2019801021684, dated Jan. 5, 2024, along with an English translation thereof.
Extended European Search Report Issued in Corresponding EP Patent Application No. 19952866.2, dated Jun. 26, 2023.

* cited by examiner

HYDRAULIC ACTUATION DEVICE

TECHNICAL FIELD

The present invention relates to a hydraulic actuation device including a tool that is hydraulically actuated.

BACKGROUND ART

Hitherto, a portable hydraulic actuation device has been used for rescue purposes, and one example thereof is disclosed, for example, in Japanese Laid-Open Patent Publication No. 2010-280011 (JP2010-280011A), etc. The hydraulic actuation device disclosed in Japanese Laid-Open Patent Publication No. 2010-280011 includes a battery, a hydraulic pressure generating unit having an electric motor supplied with power from the battery and a hydraulic pump driven by the electric motor, and a head unit which is attachable to and detachable from the hydraulic pressure generating unit and which has a tip tool driven by pressure oil generated by the hydraulic pressure generating unit. As the tip tool to be provided to the head unit, various kinds of tools such as a cutter and a spreader are prepared, and a wide variety of work can be handled by exchanging the head unit.

SUMMARY OF THE INVENTION

In the conventional hydraulic actuation device, the head unit operates when an operator holds an operation handle with their hand and moves the operation handle from an initial position to an operation position. In addition, when the operator returns the operation handle held with their hand from the operation position to the initial position, the operation of the head unit stops.

However, in recent years, in order to improve the safety of a portable hydraulic actuation device used for rescue purposes, there has been a demand for a hydraulic actuation device in which the operation of a head unit stops when an operator merely releases an operation handle from their hand after the operator holds the operation handle with their hand and moves the operation handle from an initial position to an operation position.

The present invention has been made in consideration of such circumstances, and an object of the present invention is to provide a hydraulic actuation device in which operation of a tool stops when an operator merely releases an operation handle from their hand after the operator holds the operation handle with their hand and moves the operation handle from an initial position to actuate the tool, whereby the safety of the hydraulic actuation device can be improved.

A hydraulic actuation device of the present invention comprises:
  a tool;
  an actuation part having a pressure oil supply mechanism configured to send pressure oil from an oil chamber to the tool and return oil from the tool to the oil chamber;
  an operation handle for adjusting oil passages for the pressure oil and the return oil in the pressure oil supply mechanism, the operation handle being configured to be able to be moved from an initial position; and
  biasing means configured to bias the operation handle toward the initial position when no external force is applied to the operation handle, wherein
  when the operation handle moves from the initial position, the tool is actuated by the actuation part, and
  when the operation handle is returned to the initial position by the biasing means, operation of the tool by the actuation part is stopped.

In the hydraulic actuation device of the present invention,
  the tool may have a tool member, a division member configured to divide an internal space in which the pressure oil is stored, into an advance oil chamber and a retraction oil chamber, and a piston member attached to the division member and configured to move the tool member, and
  when the operation handle moves from the initial position, the pressure oil may be sent by the actuation part from the oil chamber to the advance oil chamber or the retraction oil chamber of the tool, whereby the division member and the piston member move, and at this time, the return oil may be returned from the retraction oil chamber or the advance oil chamber to the oil chamber.

In the hydraulic actuation device of the present invention,
  the operation handle may be configured to be able to be rotated in a first rotation direction and a second rotation direction opposite to the first rotation direction, from the initial position,
  when the operation handle rotates in the first rotation direction from the initial position, the tool member of the tool may move in a first direction by the actuation part, and
  when the operation handle rotates in the second rotation direction from the initial position, the tool member of the tool may move in a second direction opposite to the first direction, by the actuation part.

The hydraulic actuation device of the present invention may further comprise a pair of reciprocating members,
  the reciprocating members may be configured to be moved in directions opposite to each other from the neutral position when the operation handle is rotated,
  the pressure oil supply mechanism may have a pair of flow passage adjustment valves corresponding to the pair of reciprocating members, and the oil passage for the pressure oil from the oil chamber to the tool and the oil passage for the return oil from the tool to the oil chamber are adjusted by the flow passage adjustment valves,
  when the reciprocating members are moved in the directions opposite to each other from the neutral position by rotation of the operation handle in the first rotation direction from the initial position, the oil passage for the pressure oil may lead from the oil chamber to the advance oil chamber of the tool and the oil passage for the return oil may lead from the retraction oil chamber of the tool to the oil chamber, whereby the division member and the piston member move in a first direction, and
  when the reciprocating members are moved in the directions opposite to each other from the neutral position by rotation of the operation handle in the second rotation direction from the initial position, the oil passage for the pressure oil may lead from the oil chamber to the retraction oil chamber of the tool and the oil passage for the return oil may lead from the advance oil chamber of the tool to the oil chamber, whereby the division member and the piston member move in a second direction opposite to the first direction.

In the hydraulic actuation device of the present invention, the flow passage adjustment valves may each have a first seal plate provided with a through hole, a second seal plate provided with a through hole, and a seal pin for sealing the through hole of the first seal plate or the through hole of the second seal plate, and the seal pin is configured to be moved by the reciprocating member, when each reciprocating member is located at the neutral position, the through hole of the first seal plate and the through hole of the second seal plate may not be sealed by the seal pin, and when each reciprocating member moves from the neutral position, the through hole of the first seal plate may be sealed by the seal pin in one of the flow passage adjustment valves, and the through hole of the second seal plate may be sealed by the seal pin in the other of the flow passage adjustment valves.

In the hydraulic actuation device of the present invention, the seal plate sealed by the seal pin in each flow passage adjustment valve may be different between when the operation handle rotates in the first rotation direction from the initial position and when the operation handle rotates in the second rotation direction from the initial position.

In the hydraulic actuation device of the present invention, the seal pin may have a cylindrical portion and a spherical end surface provided at one end portion of the cylindrical portion, a diameter of the through hole of the first seal plate may be equal to a diameter of the cylindrical portion of the seal pin, and the through hole of the first seal plate may be sealed by inserting the seal pin into the through hole of the first seal plate, and a first through hole having a diameter smaller than the diameter of the cylindrical portion of the seal pin and a second through hole having a diameter larger than the diameter of the cylindrical portion of the seal pin may be formed in the second seal plate, and the first through hole and the second through hole of the second seal plate may be sealed by the spherical end surface coming into contact with a portion between the first through hole and the second through hole when the cylindrical portion of the seal pin enters the second through hole of the second seal plate.

In the hydraulic actuation device of the present invention, an inclined surface may be formed between the first through hole and the second through hole in the second seal plate, and the first through hole and the second through hole of the second seal plate may be sealed by the spherical end surface coming into contact with the inclined surface when the cylindrical portion of the seal pin enters the second through hole of the second seal plate.

DESCRIPTION OF THE PREFERRED EMBODIMENTS

Figure 13:
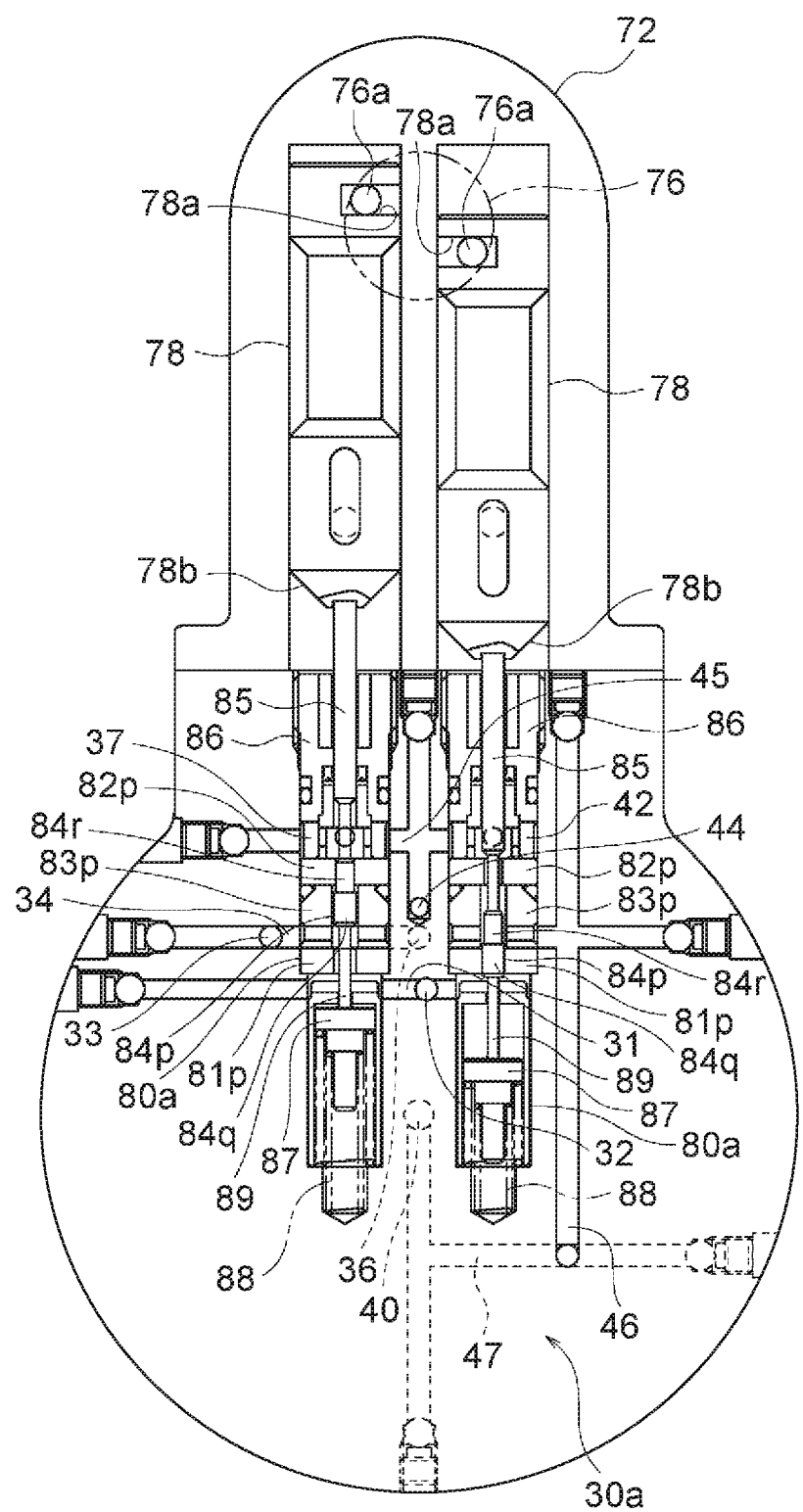
FIG. 13 is a diagram showing the internal structure of a pressure oil supply mechanism when an operation handle is located at an advance position in a cutting device having another structure according to the embodiment of the present invention.
Figure 14:
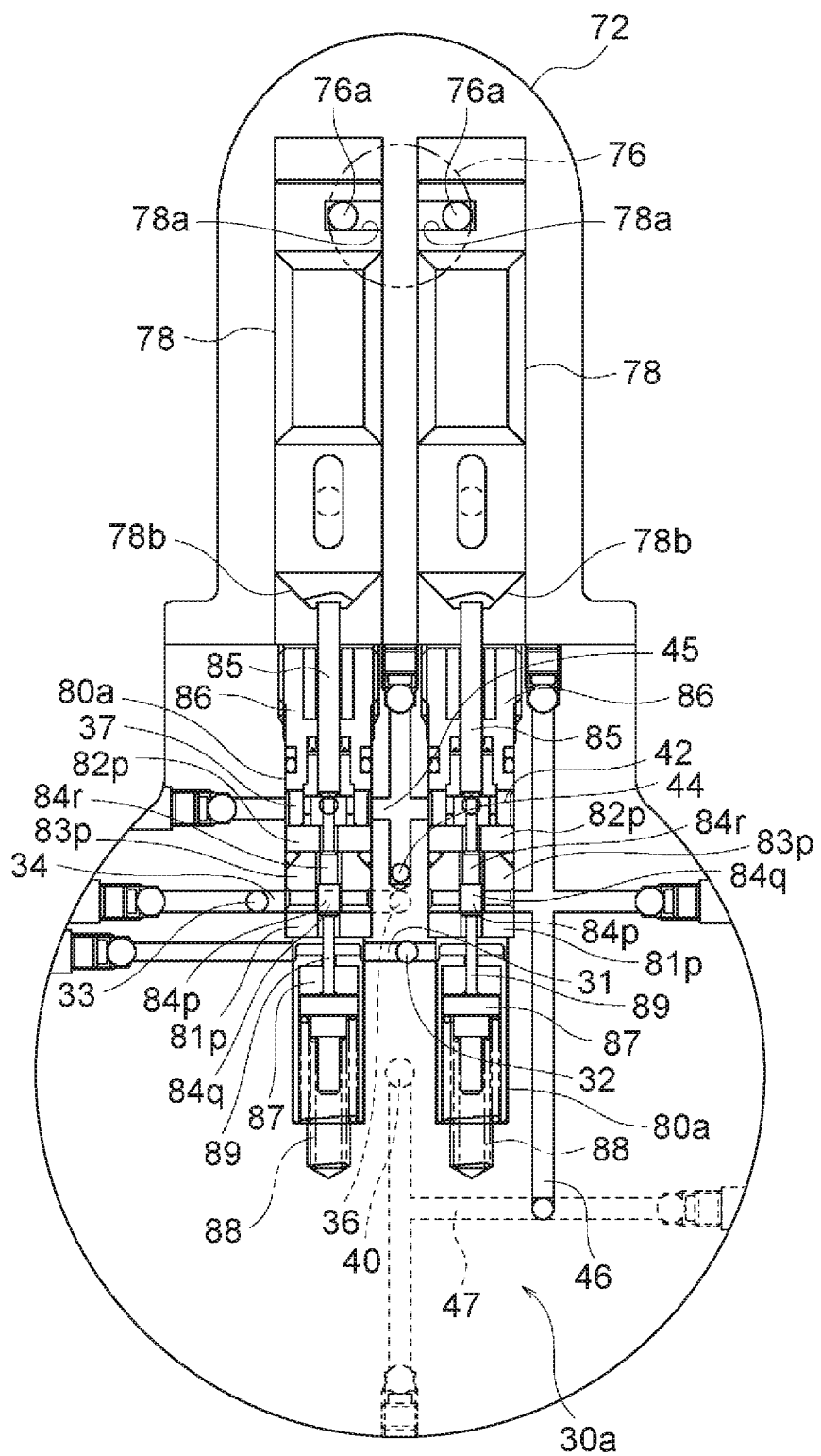
FIG. 14 is a diagram showing the internal structure of the pressure oil supply mechanism when the operation handle is located at a neutral position in the cutting device shown in FIG. 13.
Figure 15:
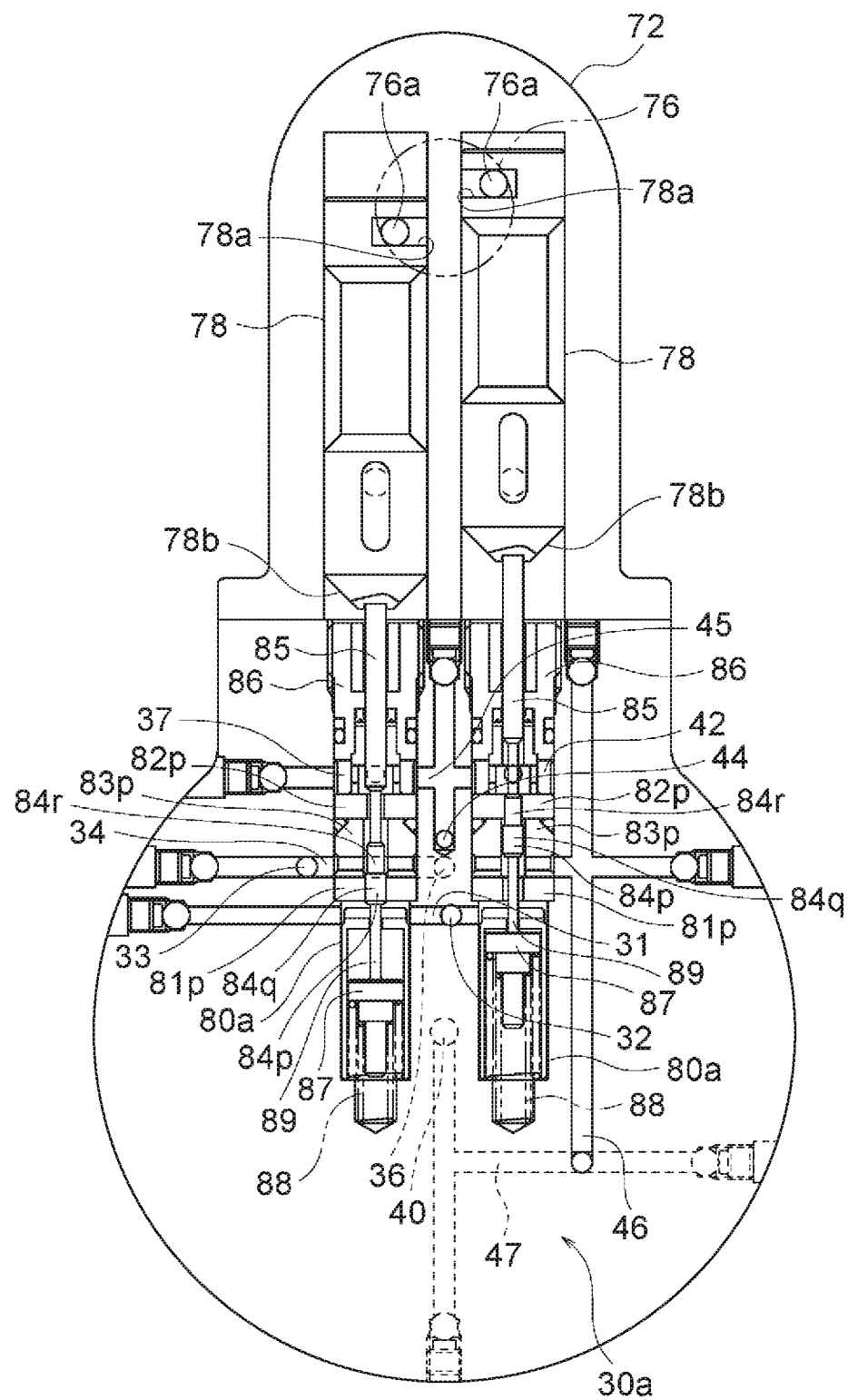
FIG. 15 is a diagram showing the internal structure of the pressure oil supply mechanism when the operation handle is located at a retraction position in the cutting device shown in FIG. 13.

Hereinafter, an embodiment of the present invention will be described with reference to the drawings. A cutting device (hydraulic actuation device) according to the present embodiment is used for purposes such as rescue, and is capable of cutting a round bar such as a reinforcing bar by a cutting part. FIG. 1 to FIG. 12 are each a diagram showing the cutting device according to the present embodiment. In addition, FIG. 13 to FIG. 15 are each a diagram showing a pressure oil supply mechanism of a cutting device having another structure according to the present embodiment. In FIG. 2 to FIG. 4, FIG. 7 to FIG. 9, and FIG. 13 to FIG. 15, in order to make it easier to see oil passages for pressure oil and return oil, a flow passage adjustment valve, etc., hatching for showing cross-sections at locations around the oil passages, the flow passage adjustment valve, etc., is omitted.

Figure 1:
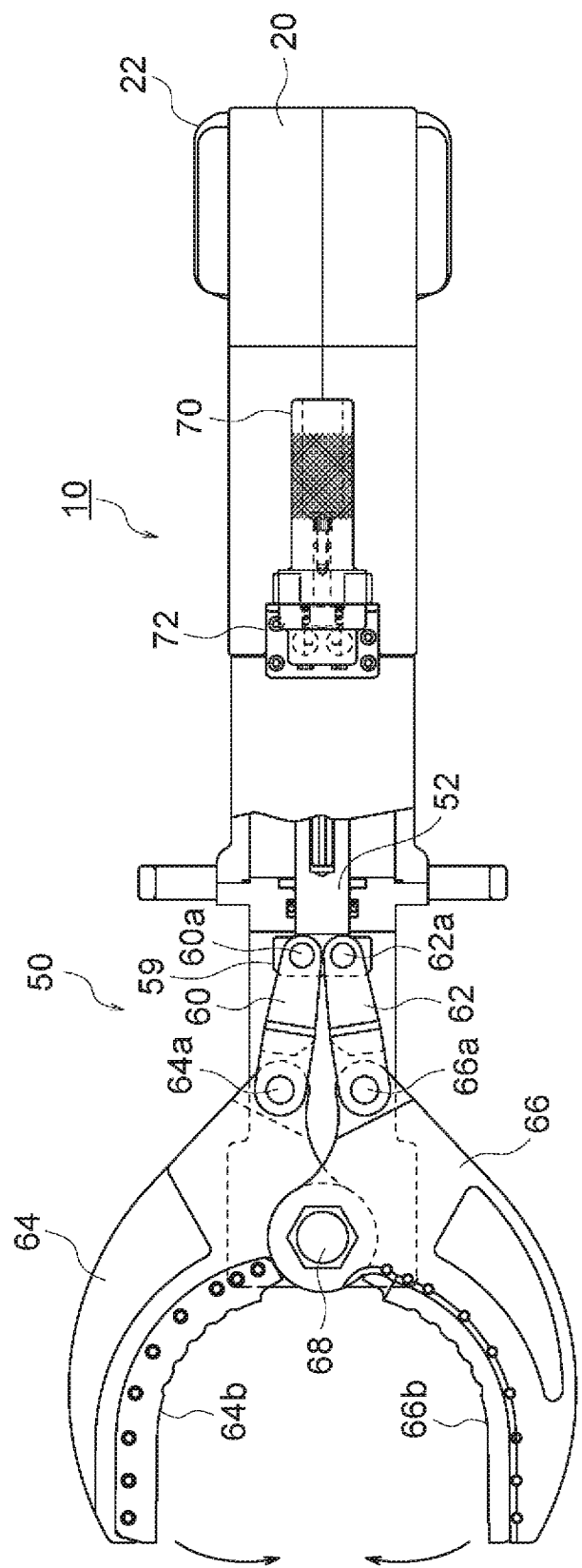
FIG. 1 is a front view showing a cutting device according to an embodiment of the present invention.

As shown in FIG. 1, etc., the cutting device 10 according to the present embodiment includes a motor 20 such as an electric motor, a battery 22 composed of a secondary battery such as a lithium ion battery or a nickel hydrogen battery, a cutting part 50 for cutting a round bar such as a reinforcing bar, and an actuation part 21 for actuating the cutting part 50. More specifically, the cutting part 50 has a pair of cutting members 64 and 66, and these cutting members 64 and 66 are rotatable about a shaft 68. A round bar such as a reinforcing bar between the pair of cutting members 64 and 66 is cut by rotating the respective cutting members 64 and 66 about the shaft 68 in directions in which the cutting members 64 and 66 are caused to approach each other. In addition, an operation handle 70 is attached to the actuation part 21, and a worker can adjust the rotation directions of the respective cutting members 64 and 66 about the shaft 68 by operating the operation handle 70. In the present embodiment, the operation handle 70 has a cylindrical shape, and, when the worker holds the operation handle 70 with their hand and rotates the operation handle 70 in a forward direction or a reverse direction from an initial position, the respective cutting members 64 and 66 rotate about the shaft 68 in the directions in which the cutting members 64 and 66 approach each other or in directions in which the cutting members 64 and 66 move away from each other. Moreover, in the present embodiment, when the worker releases the operation handle 70 from their hand, the operation handle 70 returns to the initial position. When the operation handle 70 returns to the initial position, the respective cutting members 64 and 66 stop. Such an operation will be described in detail later.

Figure 2:
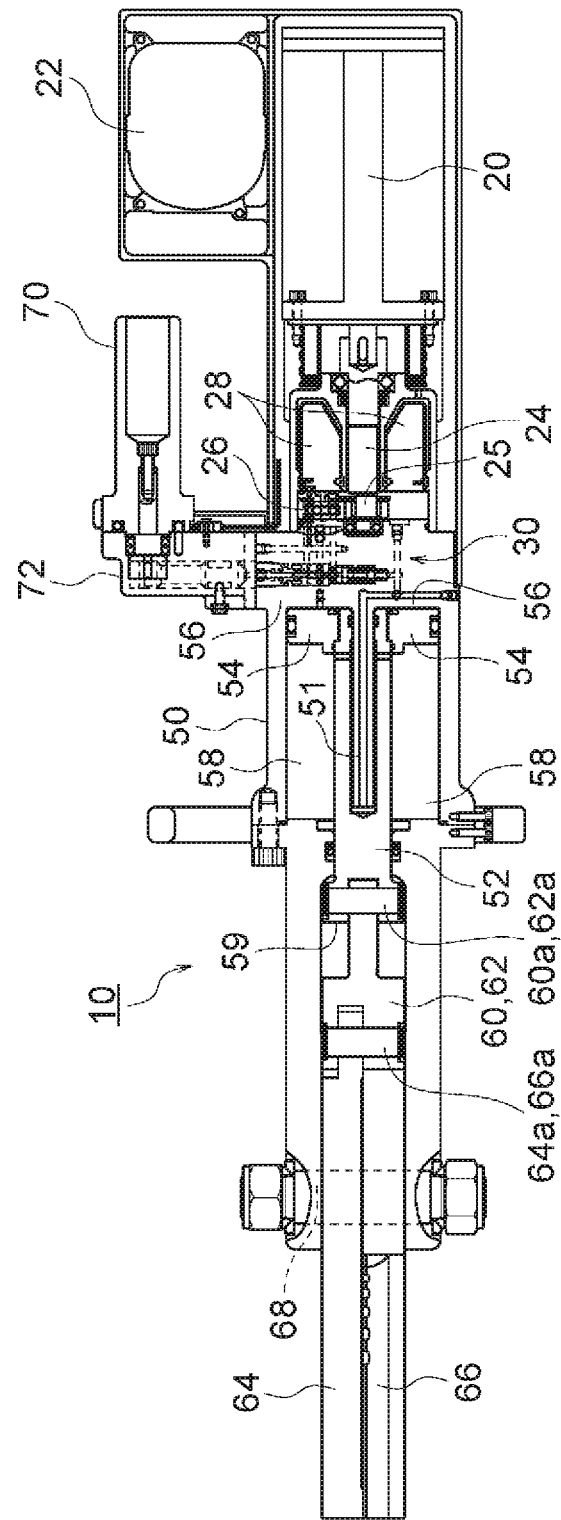
FIG. 2 is a side view showing the internal structure of the cutting device shown in FIG. 1 as viewed from the lateral side.

As shown in FIG. 2, a rotation shaft 24 is attached to the motor 20, and the rotation shaft 24 attached to the motor 20 can be rotated when power is supplied from the battery 22 to the motor 20. In addition, an eccentric member 25 is attached to a distal end of the rotation shaft 24. The eccentric member 25 is eccentric with respect to the axis of the rotation shaft 24, and a bearing such as a needle roller bearing is attached to the outer circumferential surface of the eccentric member 25.

The actuation part 21 has a piston 26 which is provided around the eccentric member 25, an oil chamber 28, and a pressure oil supply mechanism 30 which sends the pressure oil from the oil chamber 28 to the cutting part 50 and returns the pressure oil from the cutting part 50 to the oil chamber 28. The piston 26 moves up and down by rotation of the eccentric member 25. In addition, the piston 26 is constantly pressed toward the outer circumferential surface of the bearing by a spring which is not shown. Thus, when the rotation shaft 24 is rotated by the motor 20, the eccentric member 25 and the bearing make eccentric rotation motion relative to the axis of the rotation shaft 24, whereby the piston 26 moves up and down, and the pressure oil is sent from the oil chamber 28 toward the pressure oil supply mechanism 30 and supplied from the pressure oil supply mechanism 30 to the cutting part 50, thereby actuating the cutting part 50.

The structure of the cutting part 50 will be described with reference to FIG. 1 and FIG. 2. The cutting part 50 has the pair of cutting members 64 and 66 which are rotatable about the shaft 68, a base member 59, and a piston member 52 having a distal end to which the base member 59 is attached. A blade portion 64*b* for cutting a round bar is provided at a portion, of the cutting member 64, which faces the cutting member 66. In addition, a blade portion 66*b* for cutting a round bar is provided at a portion, of the cutting member 66, which faces the cutting member 64. Moreover, the cutting member 64 and the base member 59 are connected by a connection member 60. More specifically, the cutting member 64 is connected to the connection member 60 so as to be rotatable relative to the connection member 60 about a shaft 64*a* provided at a proximal portion of the cutting member 64. In addition, the connection member 60 is connected to the base member 59 so as to be rotatable relative to the base member 59 about a shaft 60*a* provided at a proximal portion of the connection member 60. Moreover, the cutting member 66 and the base member 59 are connected by a connection member 62. More specifically, the cutting member 66 is connected to the connection member 62 so as to be rotatable relative to the connection member 62 about a shaft 66*a* provided at a proximal portion of the cutting member 66. In addition, the connection member 62 is connected to the base member 59 so as to be rotatable relative to the base member 59 about a shaft 62*a* provided at a proximal portion of the connection member 62.

In such a cutting device 10, when the pressure oil is sent by the pressure oil supply mechanism 30 from the oil chamber 28 to an advance position (described later) of the cutting part 50, the piston member 52 is pushed out toward the left side in FIG. 1 and FIG. 2. Then, when the piston member 52 is pushed out toward the left side in FIG. 1 and FIG. 2, the base member 59 also moves in a leftward direction in FIG. 1 and FIG. 2. Accordingly, the respective cutting members 64 and 66 are pushed and moved by the respective connection members 60 and 62, which are rotatably connected to a distal end portion of the base member 59. Specifically, the respective cutting members 64 and 66 rotate about the shaft 68 in the directions of arrows in FIG. 1. Since the respective cutting members 64 and 66 rotate about the shaft 68 in the directions in which the cutting members 64 and 66 approach each other as described above, a round bar such as a reinforcing bar located between the respective cutting members 64 and 66 is cut. Meanwhile, after the round bar such as a reinforcing bar located between the respective cutting members 64 and 66 is cut, when the base member 59 moves in a rightward direction in FIG. 1 and FIG. 2, the proximal portions of the cutting members 64 and 66 are pulled by the respective connection members 60 and 62, which are rotatably connected to the distal end portion of the base member 59, so that these cutting members 64 and 66 rotate about the shaft 68 in the directions in which the cutting members 64 and 66 move away from each other (that is, the directions opposite to those of the arrows in FIG. 1).

In the present embodiment, as described above, the actuation part 21 for actuating the cutting part 50 has the pressure oil supply mechanism 30 which sends the pressure oil from the oil chamber 28 to the cutting part 50 and returns the pressure oil from the cutting part 50 to the oil chamber 28. In addition, the operation handle 70 is provided to the actuation part 21, and the worker can adjust flow passages for the pressure oil and the return oil by the pressure oil supply mechanism 30, by operating the operation handle 70. Accordingly, the worker can adjust the rotation directions of the respective cutting members 64 and 66 about the shaft 68 by operating the operation handle 70. In addition, in the present embodiment, the operation handle 70 returns to the initial position when the worker releases the operation handle 70 from their hand, and in this case, the respective cutting members 64 and 66 stop. The structures of such a pressure oil supply mechanism 30, the operation handle 70, and two flow passage adjustment valves 80 provided to the pressure oil supply mechanism 30 will be described in detail below.

Figure 4:
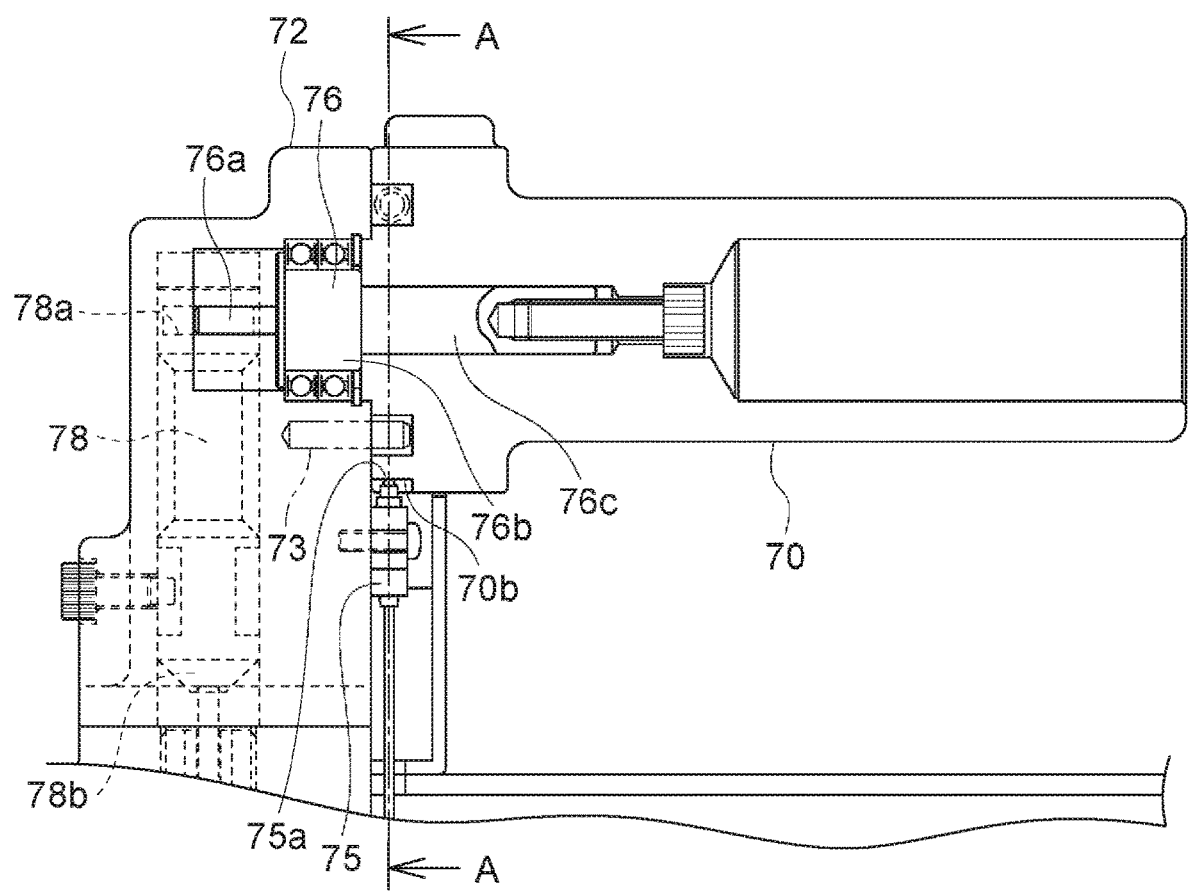
FIG. 4 is a side view showing the internal structure of an operation handle in the cutting device shown in FIG. 1.
Figure 5:
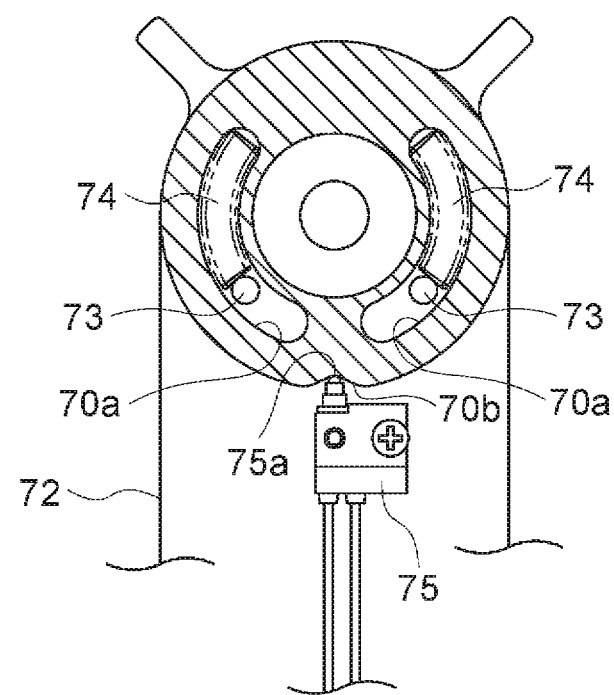
FIG. 5 is a cross-sectional view of the operation handle shown in FIG. 4, taken along a line A-A.

First, the structure of the operation handle 70 will be described with reference to FIG. 3 to FIG. 6. When the worker holds the operation handle 70 with their hand, the worker can rotate the operation handle 70 in both directions from the initial position. Such an operation handle 70 is supported by a handle support portion 72 attached to the actuation part 21. In addition, the operation handle 70 is rotatable relative to the handle support portion 72. The rotation angle of the operation handle 70 from the initial position is limited to a magnitude within a predetermined range. In addition, after the operation handle 70 is rotated from the initial position, when the worker releases the operation handle 70 from their hand, the operation handle 70 returns to the initial position. Specifically, as shown in FIG. 4 and FIG. 5, two arc-shaped grooves 70a are formed in the operation handle 70. In addition, two stopper pins 73 are attached to the handle support portion 72, and the respective stopper pins 73 are fitted into the respective grooves 70a. Moreover, a spring 74 is provided inside each groove 70a. One end of each spring 74 is in contact with the stopper pin 73, and the other end of each spring 74 is in contact with an end portion of the groove 70a. Accordingly, when the worker does not hold the operation handle 70 with their hand, the operation handle 70 is maintained at a position shown in FIG. 5, by the springs 74 provided inside the respective grooves 70a. Such a position is defined as the initial position of the operation handle 70. Meanwhile, when the worker holds the operation handle 70 with their hand and rotates the operation handle 70 in the forward direction or the reverse direction from the initial position, each groove 70a rotates in a state where the respective stopper pins 73 are fitted into the respective grooves 70a. Accordingly, one spring 74 out of the two springs 74 is compressed between the end portion of the groove 70a and the stopper pin 73. Thus, when the worker releases the operation handle 70 from their hand, the operation handle 70 rotates and returns to the original position, that is, the initial position, by the force of the compressed spring 74 returning to the original state.

As shown in FIG. 4 and FIG. 5, an initial position detection sensor 75 for detecting whether or not the operation handle 70 is located at the initial position is provided. The initial position detection sensor 75 has a protrusion 75a which can advance toward and retract from the operation handle 70. In addition, a recess 70b is formed on the outer circumferential surface of the operation handle 70. As shown in FIG. 5, when the operation handle 70 is located at the initial position, the protrusion 75a of the initial position detection sensor 75 enters the recess 70b of the operation handle 70. Meanwhile, when the worker holds the operation handle 70 with their hand and rotates the operation handle 70 from the initial position, the protrusion 75a comes out of the recess 70b. In this case, the protrusion 75a comes into contact with the outer circumferential surface of the operation handle 70, whereby the protrusion 75a is pushed in a downward direction in FIG. 5. Accordingly, the initial position detection sensor 75 detects that the position of the operation handle 70 is no longer the initial position.

Figure 6:
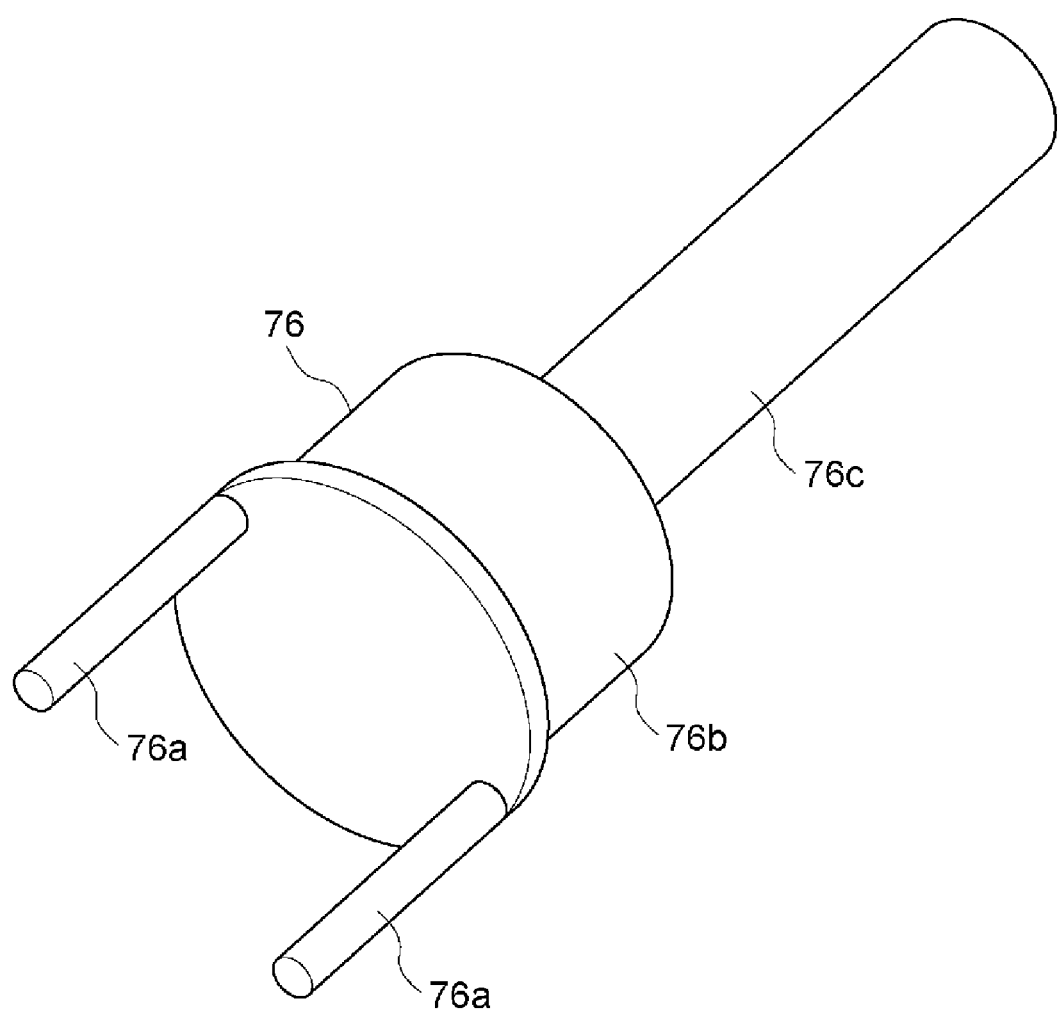
FIG. 6 is a perspective view showing the structure of a phase adjustment member in the operation handle shown in FIG. 4.

As shown in FIG. 4, a phase adjustment member 76 is attached to the operation handle 70. Here, the axis of the operation handle 70 coincides with the axis of the phase adjustment member 76. Therefore, when the worker holds the operation handle 70 with their hand and rotates the operation handle 70 from the initial position, the phase adjustment member 76 also rotates synchronously. The structure of the phase adjustment member 76 will be described in detail with reference to FIG. 6 to FIG. 9. As shown in FIG. 6, the phase adjustment member 76 has a cylindrical body portion 76b which is disposed inside the handle support portion 72, two rod-shaped protrusions 76a which are attached to one end surface of the body portion 76b, and a base portion 76c which is attached to the other end surface of the body portion 76b. The base portion 76c is provided inside the operation handle 70. When the operation handle 70 rotates, the base portion 76c also rotates integrally.

Figure 7:
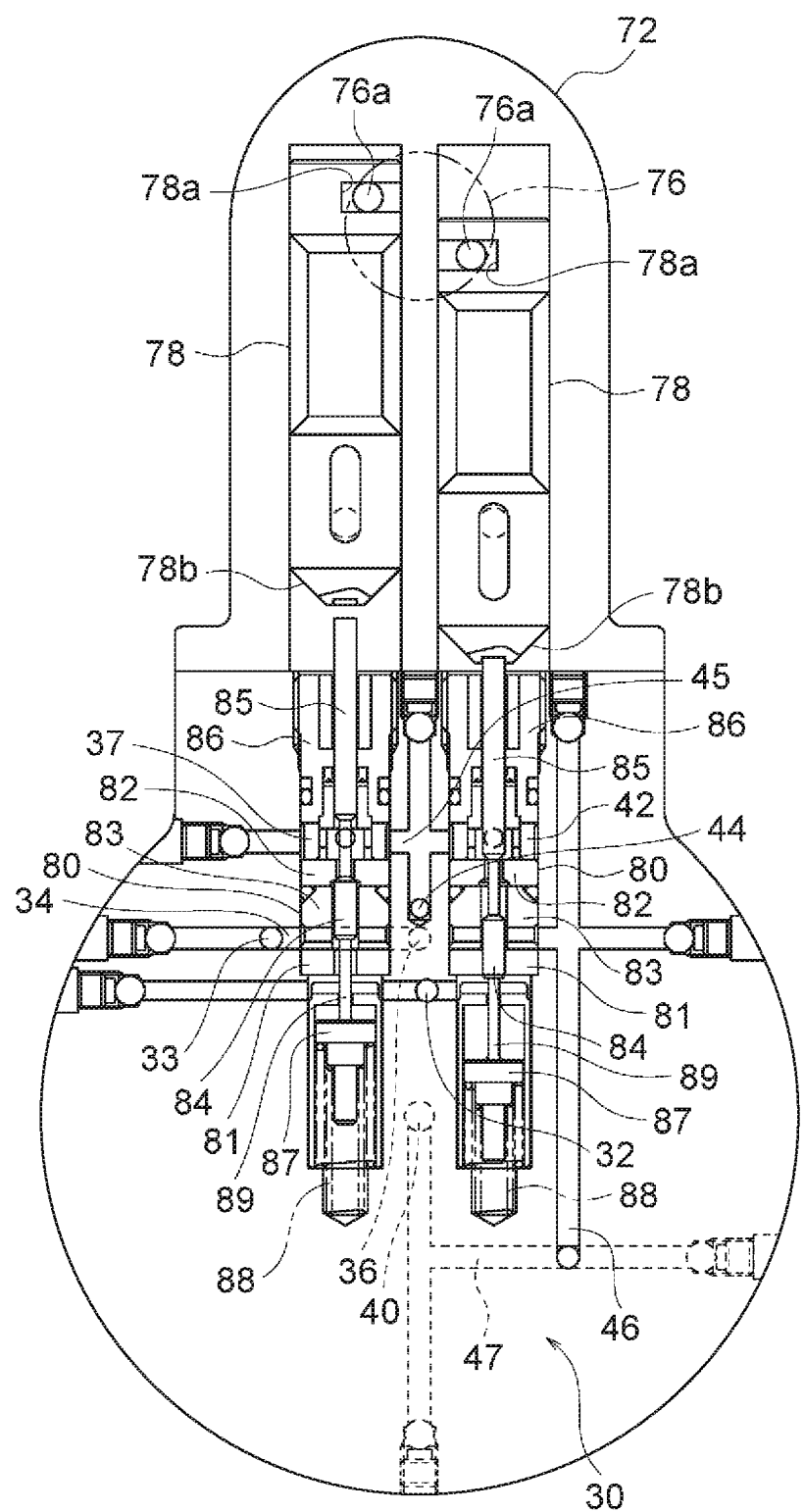
FIG. 7 is a diagram showing the internal structure of a pressure oil supply mechanism when the operation handle is located at an advance position in the cutting device shown in FIG. 1.
Figure 8:
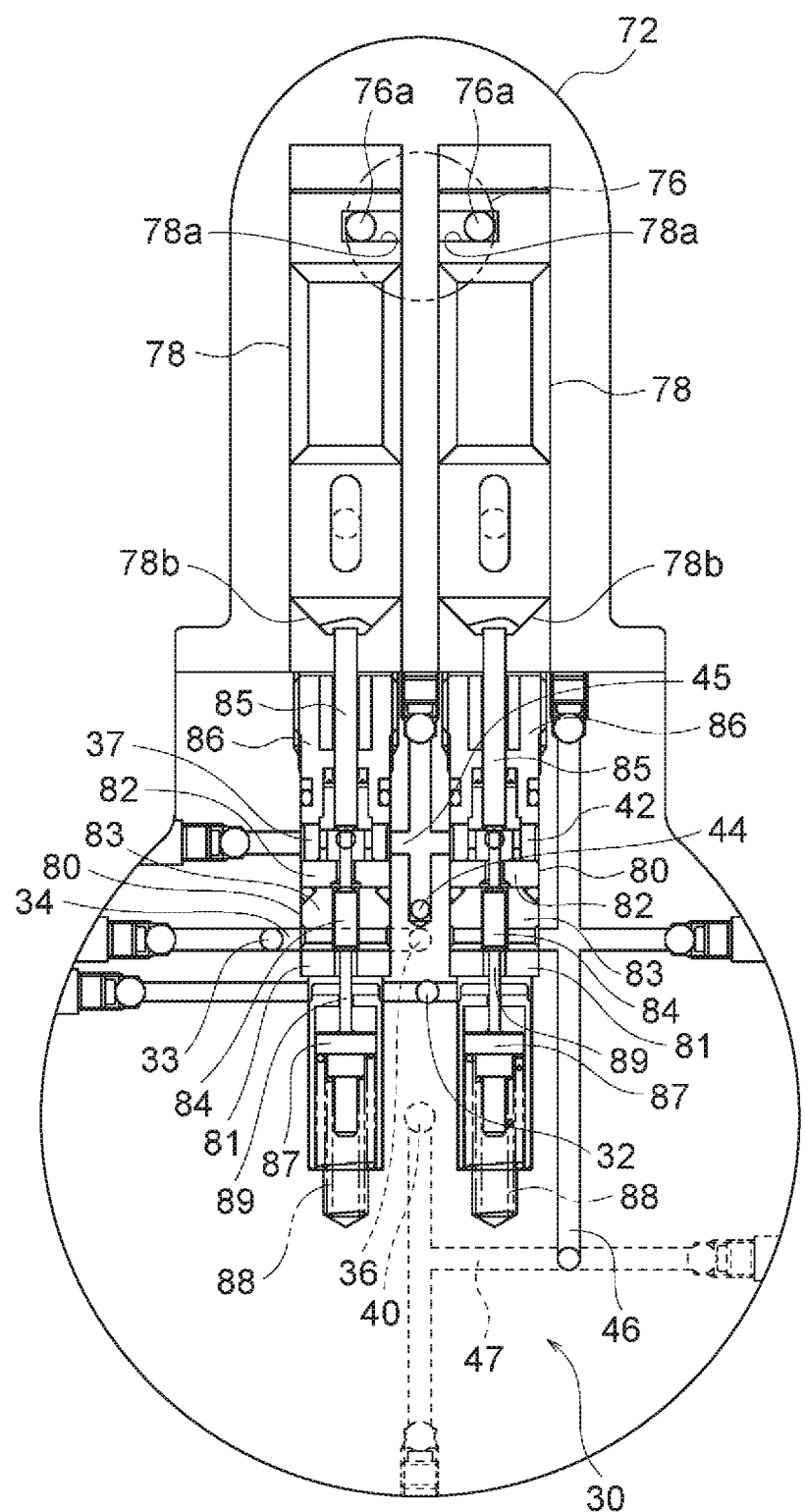
FIG. 8 is a diagram showing the internal structure of the pressure oil supply mechanism when the operation handle is located at a neutral position in the cutting device shown in FIG. 1.
Figure 9:
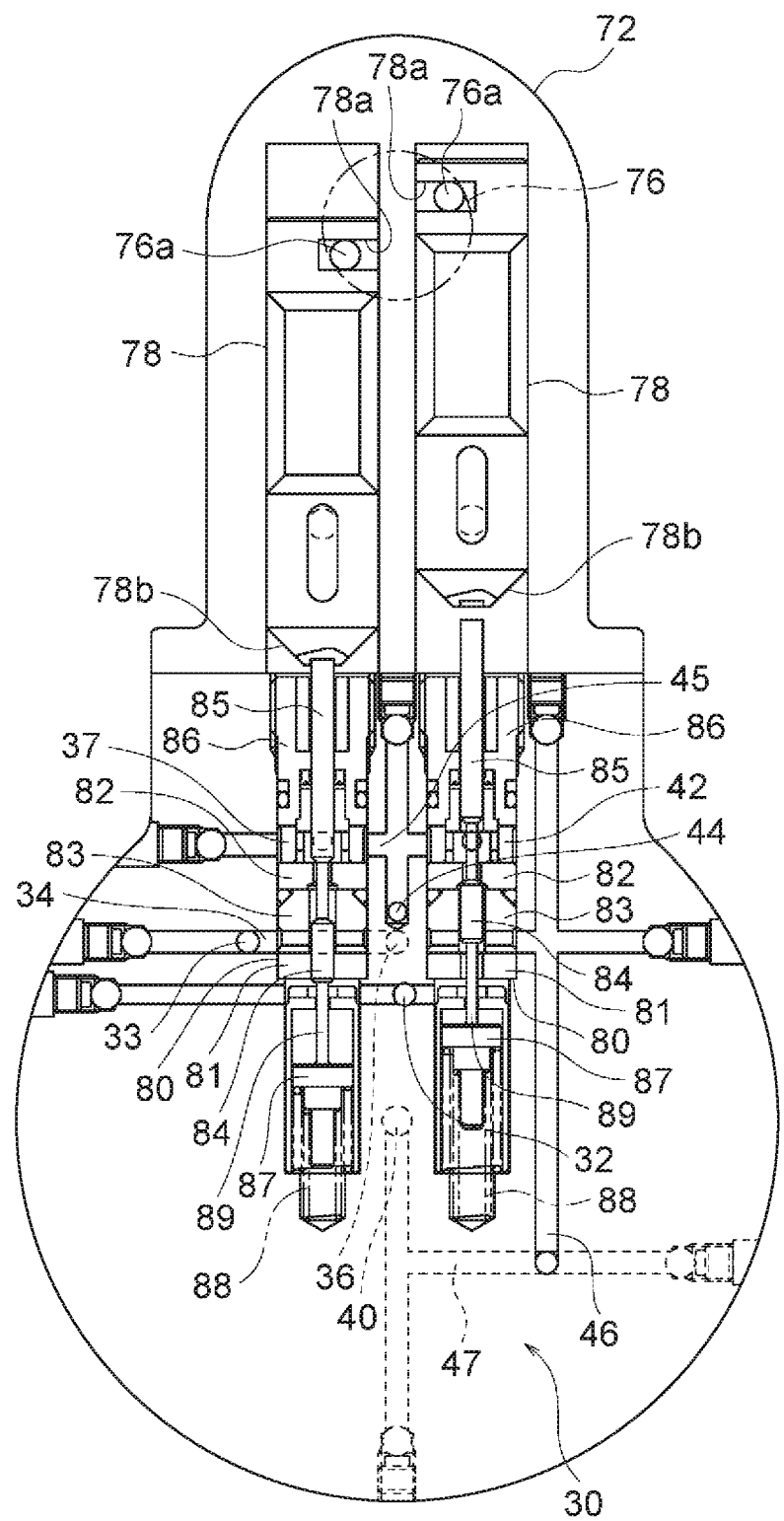
FIG. 9 is a diagram showing the internal structure of the pressure oil supply mechanism when the operation handle is located at a retraction position in the cutting device shown in FIG. 1.

As shown in FIG. 7 to FIG. 9, a pair of left and right reciprocating members 78 are disposed inside the handle support portion 72, and a groove 78a into which the protrusion 76a of the phase adjustment member 76 is fitted is formed in each reciprocating member 78. Accordingly, when the phase adjustment member 76 rotates in synchronization with the operation handle 70, each reciprocating member 78 moves in an up-down direction in FIG. 7 to FIG. 9. Specifically, when the operation handle 70 is located at the initial position, each reciprocating member 78 is located at a neutral position shown in FIG. 8. In this case, the heights of the respective reciprocating members 78 in the up-down direction in FIG. 8 are the same. Meanwhile, when the worker holds the operation handle 70 with their hand and rotates the operation handle 70 rightward, the phase adjustment member 76 rotates in a clockwise direction in FIG. 7 to FIG. 9. Accordingly, as shown in FIG. 7, of the two protrusions 76a, the left protrusion 76a moves upward, and the right protrusion 76a moves downward. In this case, the left reciprocating member 78 in FIG. 7 is pushed and moved upward from the neutral position by the corresponding protrusion 76a, and the right reciprocating member 78 is pushed and moved downward from the neutral position by the corresponding protrusion 76a. Such a position of each reciprocating member 78 is defined as an advance position. In addition, when the worker holds the operation handle 70 with their hand and rotates the operation handle 70 leftward, the phase adjustment member 76 rotates in a counterclockwise direction in FIG. 7 to FIG. 9. Accordingly, as shown in FIG. 9, of the two protrusions 76a, the left protrusion 76a moves downward, and the right protrusion 76a moves upward. In this case, the left reciprocating member 78 in FIG. 9 is pushed and moved downward from the neutral position by the corresponding protrusion 76a, and the right reciprocating member 78 is pushed and moved upward from the neutral position by the corresponding protrusion 76a. Such a position of each reciprocating member 78 is defined as a retraction position.

Figure 3:
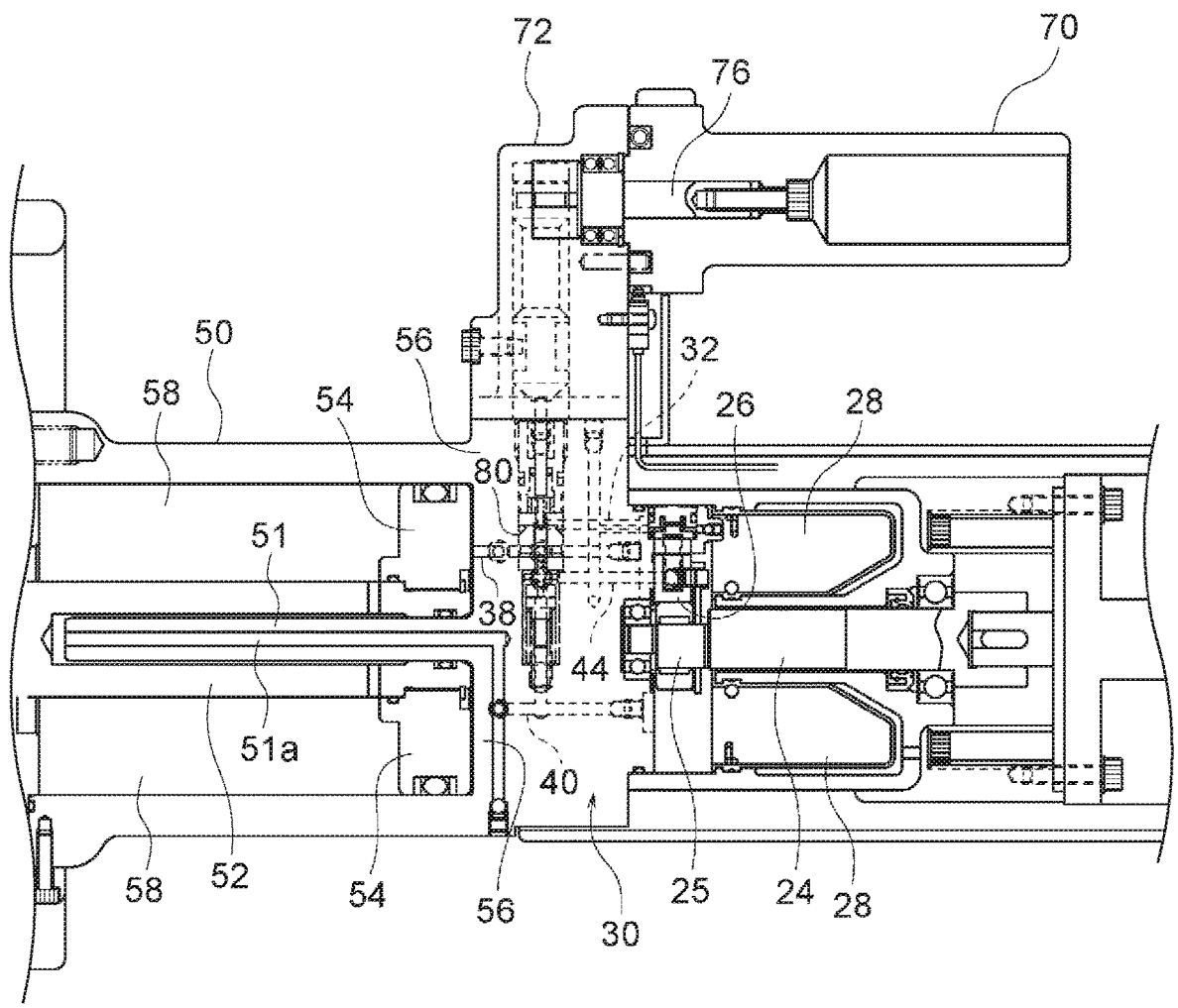
FIG. 3 is a partially-enlarged side view of the internal structure of the cutting device shown in FIG. 2.

As shown in FIG. 2 and FIG. 3, the cutting part 50 has a body portion 56 in which an internal space in which the pressure oil is stored is formed. In addition, a division member 54 which divides the internal space formed inside the body portion 56, into two regions is provided inside the body portion 56. Moreover, an end portion of the piston member 52 is connected to the division member 54. Of the two regions partitioned by the division member 54 in the internal space in which the pressure oil is stored, the region on the right side of the division member 54 in FIG. 2 is an advance oil chamber, and the region on the left side of the division member 54 in FIG. 2 is a retraction oil chamber 58. In FIG. 2, the volume of the advance oil chamber is 0. When the division member 54 moves toward the left side in FIG. 2, an advance oil chamber is formed between the body portion 56 and the division member 54. Then, when the pressure oil is sent from the pressure oil supply mechanism 30 to the advance oil chamber, the division member 54 is pushed by the pressure oil, whereby the division member 54 moves toward the left side in FIG. 2, and the piston member 52 also moves toward the left side in FIG. 2. Meanwhile, when the pressure oil is sent from the pressure oil supply mechanism 30 to the retraction oil chamber 58, the division member 54 is pushed by the pressure oil, whereby the division member 54 moves toward the right side in FIG. 2, and the piston member 52 also moves toward the right side in FIG. 2. In addition, a housing space in which a rod-shaped member 51 is housed is formed inside the piston member 52. Moreover, a flow passage 51a for the pressure oil is formed inside the rod-shaped member 51. When the pressure oil is sent from the pressure oil supply mechanism 30 described later to the flow passage 51a of the rod-shaped member 51, the pressure oil is sent to the retraction oil chamber 58.

As shown in FIG. 1 to FIG. 3 and FIG. 7 to FIG. 9, the pressure oil supply mechanism 30 is provided with a plurality of oil passages 32, 33, 34, 36, 37, 38, 40, 42, 45, 46, and 47 for sending the pressure oil from the oil chamber 28 to the cutting part 50 and returning the return oil from the cutting part 50 to the oil chamber 28. In addition, the pressure oil supply mechanism 30 has the two flow passage adjustment valves 80. The flow passage through which the pressure oil is sent from the oil chamber 28 to the cutting part 50 or the return oil is returned from the cutting part 50 to the oil chamber 28 is adjusted by these two flow passage adjustment valves 80. Moreover, the two flow passage adjustment valves 80 are operated by the operation handle 70. Specifically, each flow passage adjustment valve 80 is operated by each reciprocating member 78 moving up and down.

In the pressure oil supply mechanism 30, the first oil passage 32 communicates with the oil chamber 28, and the second oil passage 33 communicates with the first oil passage 32. In addition, a first seal plate 81 (described later) of the left flow passage adjustment valve 80 is provided between the first oil passage 32 and the second oil passage 33. Moreover, the third oil passage 34 communicates with the second oil passage 33. In addition, the third oil passage 34 communicates with the fourth oil passage 36, and the fourth oil passage 36 communicates with the fifth oil passage 38. The fifth oil passage 38 communicates with the advance oil chamber in the region on the right side of the division member 54 in FIG. 2 in the internal space which is formed inside the body portion 56. In addition, the sixth oil passage 37 is provided around a base portion 86 (described later) of the left flow passage adjustment valve 80, and communicates with the third oil passage 34 via a second seal plate 82 (described later) of the left flow passage adjustment valve 80.

The seventh oil passage 40 communicates with the flow passage 51a of the rod-shaped member 51. In addition, the seventh oil passage 40 communicates with the eighth oil passage 47, and the eighth oil passage 47 communicates with the ninth oil passage 46. Here, a first seal plate 81 (described later) of the right flow passage adjustment valve 80 is provided between the first oil passage 32 and the ninth oil passage 46. In addition, the tenth oil passage 42 is provided around a base portion 86 (described later) of the right flow passage adjustment valve 80, and communicates with the ninth oil passage 46 via a second seal plate 82 (described later) of the right flow passage adjustment valve 80. Moreover, a drain pipe 44 for returning the pressure oil to the oil chamber 28 is provided, and communicates with the eleventh oil passage 45. The eleventh oil passage 45 communicates with each of the sixth oil passage 37 and the tenth oil passage 42.

Next, the structure of each flow passage adjustment valve 80 will be described in detail with reference to FIG. 7 to FIG. 12. As shown in FIG. 7 to FIG. 12, each flow passage adjustment valve 80 has the first seal plate 81, the second seal plate 82, a valve seat 83 which is provided between the first seal plate 81 and the second seal plate 82, a seal pin 84 which is provided inside the valve seat 83, an actuation pin 85 which is attached to the seal pin 84, and the base portion 86 through which the actuation pin 85 penetrates. In the exploded perspective view of FIG. 10, in order to make it easier to see the seal pin 84, the valve seat 83 is not shown.

Figure 11:
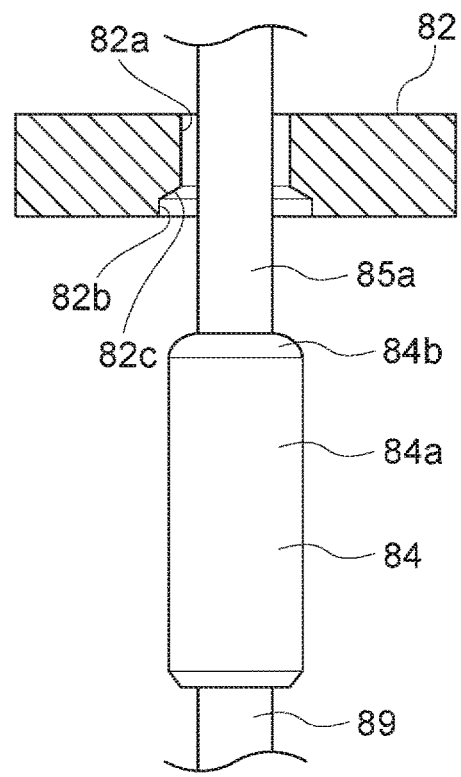
FIG. 11 is a structural diagram showing a state when a through hole of a second seal plate is not sealed by a seal pin in the pressure oil supply mechanism of the cutting device shown in FIG. 1.
Figure 12:
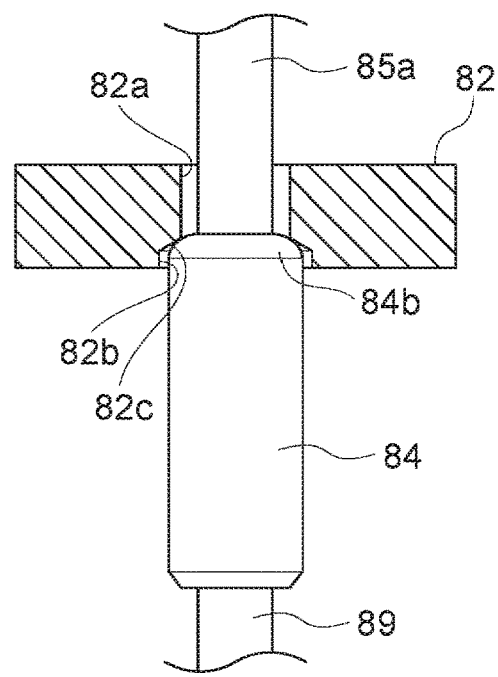
FIG. 12 is a structural diagram showing a state when the through hole of the second seal plate is sealed by the seal pin in the pressure oil supply mechanism of the cutting device shown in FIG. 1.

More specifically, as shown in FIG. 11 and FIG. 12, the seal pin 84 has a cylindrical portion 84a and a spherical end surface 84b which is provided at one end portion (specifically, an end portion on the second seal plate 82 side) of the cylindrical portion 84a. In addition, the actuation pin 85 has a first cylindrical portion 85a and a second cylindrical portion 85b having a larger diameter than the first cylindrical portion 85a, and the distal end of the first cylindrical portion 85a is attached to the spherical end surface 84b of the seal pin 84.

A through hole 81a having a uniform diameter is formed in the first seal plate 81. The diameter of the through hole 81a is substantially equal to the diameter of the cylindrical portion 84a of the seal pin 84. Therefore, when the cylindrical portion 84a of the seal pin 84 enters the through hole 81a of the first seal plate 81, the through hole 81a of the first seal plate 81 is sealed by the seal pin 84.

As shown in FIG. 11 and FIG. 12, a through hole including a first through hole 82a and a second through hole 82b is formed in the second seal plate 82. Here, the diameter of the second through hole 82b is larger than the diameter of the first through hole 82a. In addition, the diameter of the first through hole 82a is smaller than the diameter of the cylindrical portion 84a of the seal pin 84. Meanwhile, the diameter of the second through hole 82b is larger than the diameter of the cylindrical portion 84a of the seal pin 84. In addition, the diameter of the first through hole 82a is larger than the diameter of the first cylindrical portion 85a of the actuation pin 85. Moreover, an inclined surface 82c is formed between the first through hole 82a and the second through hole 82b in the through hole of the second seal plate 82. When the seal pin 84 is pushed and moved toward the second seal plate 82, as shown in FIG. 12, the spherical end surface 84b of the seal pin 84 comes into contact with the inclined surface 82c of the second seal plate 82, whereby the through hole of the second seal plate 82 is closed by the seal pin 84.

As shown in FIG. 7 to FIG. 9, the first seal plate 81 is attached to one end surface of the valve seat 83. In addition, the second seal plate 82 is attached to the other end surface of the valve seat 83. Moreover, a through hole is formed in the valve seat 83, and the seal pin 84 moves up and down inside this through hole. The diameter of the through hole of the valve seat 83 is larger than the diameter of the cylindrical portion 84a of the seal pin 84. Therefore, the pressure oil can pass through the gap between the outer circumferential surface of the through hole of the valve seat 83 and the outer circumferential surface of the cylindrical portion 84a of the seal pin 84.

The base portion 86 is attached to the surface of the second seal plate 82 opposite to the surface to which the valve seat 83 is attached. A through hole is formed in the base portion 86, and the actuation pin 85 moves up and down inside this through hole. The diameter of the through hole of the base portion 86 is substantially equal to the diameter of the second cylindrical portion 85b of the actuation pin 85. Therefore, the through hole of the base portion 86 is sealed by the actuation pin 85.

As shown in FIG. 7 to FIG. 9, in each flow passage adjustment valve 80, one end of a connection portion 89 is connected to the lower end surface of the cylindrical portion 84a of the seal pin 84, and a seal plate 87 is attached to the other end of the connection portion 89. In addition, a spring 88 is disposed below the seal plate 87 in a compressed state. Accordingly, the seal plate 87 is pushed and moved in an upward direction shown in FIG. 7 to FIG. 9, by the force of the compressed spring 88 returning to the original state.

As shown in FIG. 8, when each reciprocating member 78 is located at the neutral position, the upper end of the second cylindrical portion 85b of each actuation pin 85 is in contact with a pushing portion 78b of each reciprocating member 78. Specifically, the seal plate 87 is pushed and moved in the upward direction shown in FIG. 7 to FIG. 9, by the force of the compressed spring 88 returning to the original state, whereby the seal pin 84 and the actuation pin 85, which are connected to the seal plate 87 via the connection portion 89, are also pushed and moved in the upward direction shown in FIG. 7 to FIG. 9. However, when the upper end of the second cylindrical portion 85b of each actuation pin 85 comes into contact with the pushing portion 78b of each reciprocating member 78, the seal pin 84 and the actuation pin 85 do not move upward more, so that the seal pin 84 is housed in the through hole of the valve seat 83. In this state, the first seal plate 81 and the second seal plate 82 are not sealed by the seal pin 84.

Meanwhile, as shown in FIG. 7, when each reciprocating member 78 moves to the advance position, the left reciprocating member 78 moves upward, whereby the pushing portion 78b of this reciprocating member 78 moves upward away from the second cylindrical portion 85b of the left actuation pin 85. In this case, the seal plate 87 is pushed and moved in the upward direction shown in FIG. 7 to FIG. 9, by the force of the compressed spring 88 returning to the original state, whereby the seal pin 84 and the actuation pin 85, which are connected to the seal plate 87 via the connection portion 89, are also pushed and moved in the upward direction shown in FIG. 7 to FIG. 9. In this case, the through hole of the second seal plate 82 is sealed by the seal pin 84 in the left flow passage adjustment valve 80. In this state, the first seal plate 81 is not sealed by the seal pin 84 in the left flow passage adjustment valve 80. In addition, when each reciprocating member 78 moves to the advance position, the right reciprocating member 78 moves downward, whereby the pushing portion 78b of this reciprocating member 78 pushes and moves the second cylindrical portion 85b of the right actuation pin 85 downward. Accordingly, in the right flow passage adjustment valve 80, the cylindrical portion 84a of the seal pin 84 enters the through hole 81a of the first seal plate 81, so that the through hole 81a of the first seal plate 81 is sealed by the seal pin 84. In this state, the second seal plate 82 is not sealed by the seal pin 84 in the right flow passage adjustment valve 80.

As shown in FIG. 9, when each reciprocating member 78 moves to the retraction position, the left reciprocating member 78 moves downward, whereby the pushing portion 78b of this reciprocating member 78 pushes and moves the second cylindrical portion 85b of the left actuation pin 85 downward. Accordingly, in the left flow passage adjustment valve 80, the cylindrical portion 84a of the seal pin 84 enters the through hole 81a of the first seal plate 81, so that the through hole 81a of the first seal plate 81 is sealed by the seal pin 84. In this state, the second seal plate 82 is not sealed by the seal pin 84 in the left flow passage adjustment valve 80. In addition, when each reciprocating member 78 moves to the retraction position, the right reciprocating member 78 moves upward, whereby the pushing portion 78b of this reciprocating member 78 moves upward away from the second cylindrical portion 85b of the right actuation pin 85. In this case, the seal plate 87 is pushed and moved in the upward direction shown in FIG. 7 to FIG. 9, by the force of the compressed spring 88 returning to the original state, whereby the seal pin 84 and the actuation pin 85, which are connected to the seal plate 87 via the connection portion 89, are also pushed and moved in the upward direction shown in FIG. 7 to FIG. 9. In this case, the through hole of the second seal plate 82 is sealed by the seal pin 84 in the right flow passage adjustment valve 80. In this state, the first seal plate 81 is not sealed by the seal pin 84 in the right flow passage adjustment valve 80.

Next, operation of the cutting device 10 configured as described above will be described below. First, operation performed when cutting a round bar such as a reinforcing bar by the cutting part 50 will be described. When cutting a round bar such as a reinforcing bar by the cutting part 50, the motor 20 is driven by supplying power from the battery 22 to the motor 20. Then, when the rotation shaft 24 is rotated by the motor 20, the eccentric member 25 and the bearing make eccentric rotation motion relative to the axis of the rotation shaft 24, whereby the piston 26 moves up and down, and the pressure oil is sent from the oil chamber 28 toward the pressure oil supply mechanism 30. Next, when the worker holds the operation handle 70 with their hand and rotates the operation handle 70 rightward, the phase adjustment member 76 rotates in the clockwise direction in FIG. 7 to FIG. 9. Accordingly, as shown in FIG. 7, of the two protrusions 76a, the left protrusion 76a moves upward, and the right protrusion 76a moves downward. As a result, each reciprocating member 78 moves to the advance position as shown in FIG. 7. As described above, when each reciprocating member 78 is located at the advance position, the through hole of the second seal plate 82 is sealed by the seal pin 84 in the left flow passage adjustment valve 80. In this state, the first seal plate 81 is not sealed by the seal pin 84 in the left flow passage adjustment valve 80. In addition, the through hole 81a of the first seal plate 81 is sealed by the seal pin 84 in the right flow passage adjustment valve 80. In this state, the second seal plate 82 is not sealed by the seal pin 84 in the right flow passage adjustment valve 80.

When each reciprocating member 78 is located at the advance position, the pressure oil sent from the oil chamber 28 to the pressure oil supply mechanism 30 is sent from the first oil passage 32 through the through hole 81a of the first seal plate 81 of the left flow passage adjustment valve 80 to the second oil passage 33. Then, the pressure oil is sent from the second oil passage 33 via the third oil passage 34 to the fourth oil passage 36. At this time, since the through hole of the second seal plate 82 is sealed by the seal pin 84 in the left flow passage adjustment valve 80, the pressure oil is not sent from the third oil passage 34 to the sixth oil passage 37. Then, the pressure oil is sent from the fourth oil passage 36 to the fifth oil passage 38. Accordingly, the pressure oil is sent from the fifth oil passage 38 to the advance oil chamber, and the division member 54 is pushed and moved toward the left side in FIG. 2. In this manner, the piston member 52, which is connected to the division member 54, is pushed out toward the left side in FIG. 1 and FIG. 2. Accordingly, the respective cutting members 64 and 66 of the cutting part 50 rotate about the shaft 68 in the directions of the arrows in FIG. 1. Since the respective cutting members 64 and 66 rotate about the shaft 68 in the directions in which the cutting members 64 and 66 approach each other as described above, the round bar such as a reinforcing bar located between the respective cutting members 64 and 66 is cut.

When the division member 54 is pushed and moved toward the left side in FIG. 2, the return oil is sent from the retraction oil chamber 58 to the flow passage 51a of the rod-shaped member 51, and sent from the flow passage 51a to the seventh oil passage 40. Then, the return oil is sent from the seventh oil passage 40 through the eighth oil passage 47 and the ninth oil passage 46 to the tenth oil passage 42. Since the second seal plate 82 is not sealed by the seal pin 84 in the right flow passage adjustment valve 80 as described above, the return oil is sent from the ninth oil passage 46 through the through hole of the second seal plate 82 to the tenth oil passage 42. Then, the return oil is sent from the tenth oil passage 42 through the eleventh oil passage 45 to the drain pipe 44. In this manner, the return oil is returned from the drain pipe 44 to the oil chamber 28. Since the through hole 81a of the first seal plate 81 is sealed by the seal pin 84 in the right flow passage adjustment valve 80, the return oil is not sent from the ninth oil passage 46 to the first oil passage 32.

In a state where the worker holding the operation handle 70 with their hand has rotated the operation handle 70 rightward, when the worker releases the operation handle 70 from their hand, the operation handle 70 rotates and returns to the original position, that is, the initial position, by the force of the compressed spring 74 returning to the original state out of the two springs 74. In addition, in this case, each reciprocating member 78 returns to the position shown in FIG. 8. Here, the seal plate 87 is pushed and moved in the upward direction shown in FIG. 8, by the force of the compressed spring 88 returning to the original state, whereby the seal pin 84 and the actuation pin 85, which are connected to the seal plate 87 via the connection portion 89, are also pushed and moved in the upward direction shown in FIG. 8. However, when the upper end of the second cylindrical portion 85b of each actuation pin 85 comes into contact with the pushing portion 78b of each reciprocating member 78, the seal pin 84 and the actuation pin 85 do not move upward more, so that the seal pin 84 is housed in the through hole of the valve seat 83. In this state, the first seal plate 81 and the second seal plate 82 are not sealed by the seal pin 84.

When each reciprocating member 78 is located at the neutral position, the pressure oil sent from the oil chamber 28 to the pressure oil supply mechanism 30 is sent from the first oil passage 32 through the through hole 81a of the first seal plate 81 of the left flow passage adjustment valve 80 to the second oil passage 33. Then, the pressure oil is sent from the second oil passage 33 via the third oil passage 34 to the sixth oil passage 37. At this time, the pressure oil passes through the gap between the outer circumferential surface of the through hole of the valve seat 83 and the outer circumferential surface of the seal pin 84, whereby the pressure oil is sent from the third oil passage 34 to the sixth oil passage 37. Then, the pressure oil is sent from the sixth oil passage 37 through the eleventh oil passage 45 to the drain pipe 44. In this manner, the pressure oil is returned from the drain pipe 44 to the oil chamber 28. In addition, the pressure oil sent from the oil chamber 28 to the pressure oil supply mechanism 30 is sent from the first oil passage 32 through the through hole 81a of the first seal plate 81 and the through hole of the second seal plate 82 of the right flow passage adjustment valve 80 to the tenth oil passage 42. Then, the pressure oil is sent from the tenth oil passage 42 through the eleventh oil passage 45 to the drain pipe 44. In this manner, the pressure oil is returned from the drain pipe 44 to the oil chamber 28. As described above, when each reciprocating member 78 is located at the neutral position, the pressure oil sent from the oil chamber 28 to the pressure oil supply mechanism 30 is returned to the oil chamber 28 by the drain pipe 44. Therefore, the pressure oil is sent to neither the advance oil chamber nor the retraction oil chamber 58, so that the piston member 52 does not move. Accordingly, the operation of the cutting part 50 stops.

When returning the cutting part 50 to a state where the respective cutting members 64 and 66 are opened as shown in FIG. 1 after the round bar such as a reinforcing bar is cut by the cutting part 50, the worker holds the operation handle 70 with their hand and rotates the operation handle 70 leftward. Accordingly, the phase adjustment member 76 rotates in the counterclockwise direction in FIG. 7 to FIG. 9, and, as shown in FIG. 9, of the two protrusions 76a, the right protrusion 76a moves upward, and the left protrusion 76a moves downward. As a result, each reciprocating member 78 moves to the retraction position as shown in FIG. 9. As described above, when each reciprocating member 78 is located at the retraction position, the through hole 81a of the first seal plate 81 is sealed by the seal pin 84 in the left flow passage adjustment valve 80. In this state, the second seal plate 82 is not sealed by the seal pin 84 in the left flow passage adjustment valve 80. In addition, the through hole of the second seal plate 82 is sealed by the seal pin 84 in the right flow passage adjustment valve 80. In this state, the first seal plate 81 is not sealed by the seal pin 84 in the right flow passage adjustment valve 80.

When each reciprocating member 78 is located at the retraction position, the pressure oil sent from the oil chamber 28 to the pressure oil supply mechanism 30 is sent from the first oil passage 32 through the through hole 81a of the first seal plate 81 of the right flow passage adjustment valve 80 to the ninth oil passage 46. Then, the pressure oil is sent from the ninth oil passage 46 via the eighth oil passage 47 to the seventh oil passage 40. Accordingly, the pressure oil is sent from the seventh oil passage 40 through the flow passage 51a of the rod-shaped member 51 to the retraction oil chamber 58, and the division member 54 is pushed and moved toward the right side in FIG. 2. At this time, since the through hole of the second seal plate 82 is sealed by the seal pin 84 in the right flow passage adjustment valve 80, the pressure oil is not sent from the ninth oil passage 46 to the tenth oil passage 42. In this manner, the piston member 52, which is connected to the division member 54, is returned to the right side in FIG. 1 and FIG. 2. Accordingly, the respective cutting members 64 and 66 of the cutting part 50 rotate about the shaft 68 in the directions in which the cutting members 64 and 66 move away from each other. In this manner, the cutting part 50 returns to the state where the respective cutting members 64 and 66 are opened as shown in FIG. 1.

When the division member 54 is pushed and moved toward the right side in FIG. 2, the return oil is sent from the advance oil chamber to the fifth oil passage 38, and sent from the fifth oil passage 38 to the fourth oil passage 36. Then, the return oil is sent from the fourth oil passage 36 through the sixth oil passage 37 and the eleventh oil passage 45 to the drain pipe 44. In this manner, the return oil is returned from the drain pipe 44 to the oil chamber 28. Since the second seal plate 82 is not sealed by the seal pin 84 in the left flow passage adjustment valve 80 as described above, the return oil is sent from the fourth oil passage 36 through the through hole of the second seal plate 82 to the sixth oil passage 37. Since the first seal plate 81 is sealed by the seal pin 84 in the left flow passage adjustment valve 80, the return oil is not sent from the fourth oil passage 36 to the first oil passage 32.

The cutting device 10 (hydraulic actuation device) of the present embodiment configured as described above is provided with a tool (specifically, the cutting part 50), the actuation part 21 having the pressure oil supply mechanism 30 which sends the pressure oil from the oil chamber 28 to the tool and returns the return oil from the tool to the oil chamber 28, the operation handle 70 for adjusting the oil passages for the pressure oil and the return oil in the pressure oil supply mechanism 30, and biasing means (specifically, the stopper pin 73 and the spring 74) which bias the operation handle 70 toward the initial position when no external force is applied to the operation handle 70. In addition, the operation handle 70 can be moved from the initial position. When the operation handle 70 moves from the initial position, the tool is actuated by the actuation part 21, and when the operation handle 70 is returned to the initial position by the biasing means, the operation of the tool by the actuation part 21 is stopped. In such a cutting device 10, for example, when the worker holds the operation handle 70 with one hand and operates the operation handle 70, the operation of the tool is stopped by the worker merely releasing the operation handle 70 from their hand, so that the safety of the cutting device 10 can be improved.

In the cutting device 10 of the present embodiment, as described above, the cutting part 50 as the tool has a tool member (specifically, the pair of cutting members 64 and 66), the division member 54 which divides the internal space into the advance oil chamber and the retraction oil chamber 58, and the piston member 52 which is attached to the division member 54 and moves the tool member. When the operation handle 70 moves from the initial position, the pressure oil is sent by the actuation part 21 from the oil chamber 28 to the advance oil chamber or the retraction oil chamber 58 of the tool, whereby the division member 54 and the piston member 52 move. At this time, the return oil is returned from the advance oil chamber or the retraction oil chamber 58 to the oil chamber 28.

In the cutting device 10 of the present embodiment, as described above, the operation handle 70 can be rotated in a first rotation direction and a second rotation direction opposite to the first rotation direction, from the initial position. When the operation handle 70 rotates in the first rotation direction from the initial position, the tool member (specifically, each of the cutting members 64 and 66 of the cutting part 50) of the tool moves in a first direction (specifically, the arrow direction in FIG. 1) by the actuation part 21. In addition, when the operation handle 70 rotates in the second rotation direction from the initial position, the tool member of the tool moves in a second direction opposite to the first direction, by the actuation part 21.

The cutting device 10 is provided with the pair of reciprocating members 78, and when the operation handle 70 is moved, the respective reciprocating members 78 are moved in directions opposite to each other from the neutral position (see FIG. 8). In addition, the pressure oil supply mechanism 30 has the pair of flow passage adjustment valves 80 corresponding to the pair of reciprocating members 78, and the oil passage for the pressure oil from the oil chamber 28 to the tool (specifically, the cutting part 50) and the oil passage for the return oil from the tool to the oil chamber 28 are adjusted by the respective flow passage adjustment valves 80. Moreover, as shown in FIG. 7, when the respective reciprocating members 78 are moved in the directions opposite to each other from the neutral position by rotation of the operation handle 70 in the first rotation direction from the initial position, the oil passage for the pressure oil leads from the oil chamber 28 to the advance oil chamber of the tool and the oil passage for the return oil leads from the retraction oil chamber 58 of the tool to the oil chamber 28, whereby the division member 54 and the piston member 52 move in a first direction (that is, the leftward direction in FIG. 1 and FIG. 2). Furthermore, as shown in FIG. 9, when the respective reciprocating members 78 are moved in the directions opposite to each other from the neutral position by rotation of the operation handle 70 in the second rotation direction from the initial position, the oil passage for the pressure oil leads from the oil chamber 28 to the retraction oil chamber 58 of the tool and the oil passage for the return oil leads from the advance oil chamber of the tool to the oil chamber 28, whereby the division member 54 and the piston member 52 move in a second direction (that is, the rightward direction in FIG. 1 and FIG. 2) opposite to the first direction.

In the cutting device 10 configured as described above, advance movement and retraction movement of the piston member 52 can be smoothly made by using the respective reciprocating members 78, which are moved in the directions opposite to each other from the neutral position shown in FIG. 8 when the operation handle 70 is rotated, and also by using the pair of flow passage adjustment valves 80 corresponding to the respective reciprocating members 78. To explain in more detail, the cutting device 10 of the present embodiment is configured such that: the tool is actuated by the actuation part 21 when the operation handle 70 rotates from the initial position; and the operation of the tool by the actuation part 21 is stopped when the operation handle 70 is returned to the initial position by the biasing means. In the case where only one flow passage adjustment valve 80 is provided, even when the operation handle 70 is returned to the initial position, the flow passage adjustment valve 80 does not smoothly return to the neutral position, so that the operation of the tool does not smoothly stop in some cases. On the other hand, in the case where the pair of flow passage adjustment valves 80 are used, when the height levels of the pair of flow passage adjustment valves 80 become the same as a result of the height levels of the respective reciprocating members 78 becoming the same, the first seal plate 81 and the second seal plate 82 are not sealed by the seal pin 84 in each of the pair of flow passage adjustment valves 80. Therefore, the pressure oil sent from the oil chamber 28 to the pressure oil supply mechanism 30 is returned to the oil chamber 28 by the drain pipe 44 as it is, so that the pressure oil is no longer sent from the pressure oil supply mechanism 30 to the advance oil chamber and the retraction oil chamber 58 of the cutting part 50, and the operation of the cutting part 50 can be stopped smoothly.

Each flow passage adjustment valve 80 has the first seal plate 81 provided with the through hole 81*a*, the second seal plate 82 provided with the through hole (specifically, the first through hole 82*a* and the second through hole 82*b*), and the seal pin 84 for sealing the through hole 81*a* of the first seal plate 81 or the through hole of the second seal plate 82, and the seal pin 84 is moved by the reciprocating member 78. In addition, when each reciprocating member 78 is located at the neutral position, the through hole 81*a* of the first seal plate 81 and the through hole of the second seal plate 82 are not sealed by the seal pin 84. Meanwhile, when each reciprocating member 78 moves from the neutral position, the through hole 81*a* of the first seal plate 81 is sealed by the seal pin 84 in one flow passage adjustment valve 80, and the through hole of the second seal plate 82 is sealed by the seal pin 84 in the other flow passage adjustment valve 80.

The seal plate 81, 82 sealed by the seal pin 84 in each flow passage adjustment valve 80 is different between when the operation handle 70 rotates in the first rotation direction from the initial position and when the operation handle 70 rotates in the second rotation direction from the initial position.

The seal pin 84 has the cylindrical portion 84*a* and the spherical end surface 84*b* which is provided at one end portion of the cylindrical portion 84*a*. In addition, the diameter of the through hole 81*a* of the first seal plate 81 is equal to the diameter of the cylindrical portion 84*a* of the seal pin 84, and the through hole 81*a* of the first seal plate 81 is sealed by inserting the seal pin 84 into the through hole 81*a* of the first seal plate 81. In addition, the first through hole 82*a* having a diameter smaller than the diameter of the cylindrical portion 84*a* of the seal pin 84 and the second through hole 82*b* having a diameter larger than the diameter of the cylindrical portion 84*a* of the seal pin 84 are formed in the second seal plate 82. When the cylindrical portion 84*a* of the seal pin 84 enters the second through hole 82*b* of the second seal plate 82, the spherical end surface 84*b* comes into contact with the portion between the first through hole 82*a* and the second through hole 82*b*, whereby the through hole of the second seal plate 82 is sealed.

In the case where such a seal pin 84 is used, leakage of the pressure oil at the flow passage adjustment valve 80 can be sufficiently suppressed. More specifically, when the through hole of the second seal plate 82 is sealed by the spherical end surface 84*b* coming into contact with the portion between the first through hole 82*a* and the second through hole 82*b* when the cylindrical portion 84*a* of the seal pin 84 enters the second through hole 82*b* of the second seal plate 82, this through hole is completely closed by the seal pin 84, so that leakage of the pressure oil does not occur at the second seal plate 82. When the through hole 81*a* of the first seal plate 81 is sealed by inserting the seal pin 84 into the through hole 81*a* of the first seal plate 81, the pressure oil may leak between the outer circumferential surface of the through hole 81*a* of the first seal plate 81 and the outer circumferential surface of the seal pin 84. In particular, in the case where low-viscosity pressure oil that allows operation to be easily performed even at low temperatures is used as the pressure oil, even if the through hole 81*a* of the first seal plate 81 is sealed by the seal pin 84, there is a high possibility that the pressure oil will leak between the outer circumferential surface of the through hole 81*a* of the first seal plate 81 and the outer circumferential surface of the seal pin 84. However, in the pressure oil supply mechanism 30 shown in FIG. 7 to FIG. 9, the locations where such pressure oil may leak are two locations (specifically, the two first seal plates 81), so that leakage of the pressure oil can be suppressed as compared to the case where the locations where the pressure oil may leak are four locations as in a pressure oil supply mechanism 30*a* shown in FIG. 13 to FIG. 15 described later.

In manufacturing the seal pin 84 having the cylindrical portion 84*a* and the spherical end surface 84*b* which is provided at one end portion of the cylindrical portion 84*a*, since the cylindrical portion 84*a* is formed as one stage, the processing accuracy of a radially outer portion of the cylindrical portion 84*a* can be improved as compared to the case of manufacturing a seal pin 84*p* having cylindrical portions 84*q* and 84*r* as two stages as described later. Therefore, a clearance can be accurately set between the through hole 81*a* of the first seal plate 81 and the cylindrical portion 84*a* of the seal pin 84, and the possibility of the pressure oil leaking between the outer circumferential surface of the through hole 81*a* of the first seal plate 81 and the outer circumferential surface of the seal pin 84 can be reduced. Also, in the present embodiment, since the diameter of the through hole 81*a* of the first seal plate 81 is larger than the diameter of the first through hole 82*a* of the second seal plate 82, the force to return to the neutral position shown in FIG. 8 is constantly applied to the seal pin 84 of each flow passage adjustment valve 80 due to the difference in cross-sectional area between the through hole 81*a* of the first seal plate 81 of one flow passage adjustment valve 80 in the pair of flow passage adjustment valves 80 and the first through hole 82*a* of the second seal plate 82 of the other flow passage adjustment valve 80. Thus, after the cutting part 50 is actuated by the worker holding the operation handle 70 with their hand and rotating the operation handle 70, when the worker releases the operation handle 70 from their hand, the seal pin 84 of each flow passage adjustment valve 80 smoothly returns to the neutral position shown in FIG. 8, so that the operation of the cutting part 50 can be stopped more reliably.

The inclined surface 82*c* is formed between the first through hole 82*a* and the second through hole 82*b* in the second seal plate 82. When the cylindrical portion 84*a* of the seal pin 84 enters the second through hole 82*b* of the second seal plate 82, the spherical end surface 84*b* comes into contact with the inclined surface 82*c*, whereby the through hole of the second seal plate 82 is sealed.

In the cutting device 10 of the present embodiment, the pressure oil supply mechanism 30*a* having flow passage adjustment valves 80*a* shown in FIG. 13 to FIG. 15 may be used instead of the pressure oil supply mechanism 30 having the flow passage adjustment valves 80 shown in FIG. 7 to FIG. 12. In the description of each flow passage adjustment valve 80*a* shown in FIG. 13 to FIG. 15, components that are the same as those of the flow passage adjustment valve 80 shown in FIG. 7 to FIG. 12 are designated by the same reference characters, and the description thereof is omitted.

Figure 10:
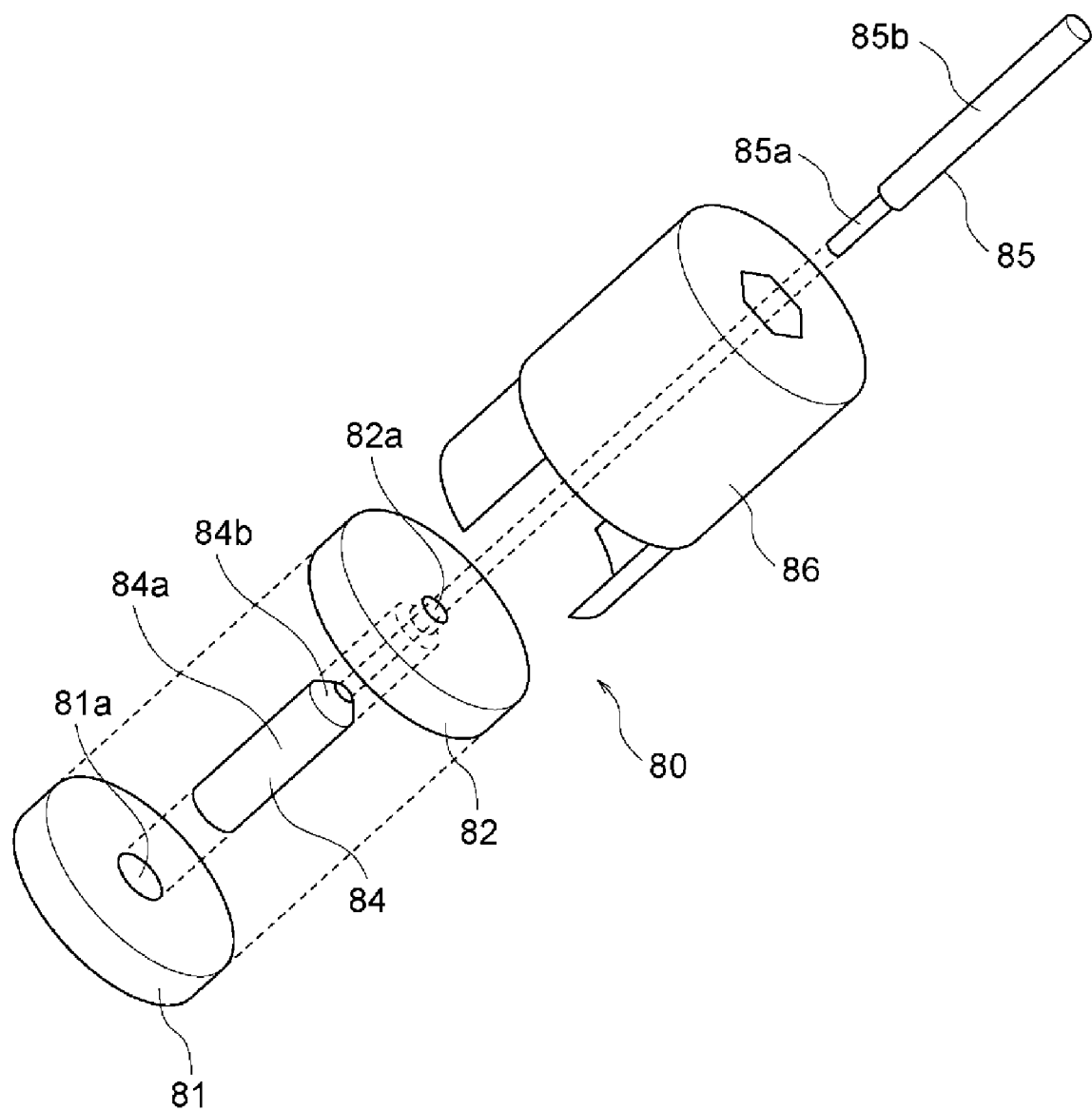
FIG. 10 is an exploded perspective view of a flow passage adjustment valve in the pressure oil supply mechanism of the cutting device shown in FIG. 1.

In each flow passage adjustment valve 80*a* shown in FIG. 13 to FIG. 15, the seal pin 84*p* having the first cylindrical portion 84*q* and the second cylindrical portion 84*r* having a diameter smaller than the diameter of the first cylindrical portion 84*q* is used instead of the seal pin 84 provided with the spherical end surface 84*b* at one end portion of the cylindrical portion 84*a* as shown in FIG. 10 to FIG. 12. That is, the seal pin 84*p* is composed of cylindrical portions as two stages. In addition, a first seal plate 81*p* and a second seal plate 82*p* are used instead of the first seal plate 81 and the second seal plate 82, respectively.

A through hole having a uniform diameter is formed in the first seal plate 81*p*. The diameter of this through hole is substantially equal to the diameter of the first cylindrical portion 84*q* of the seal pin 84. Therefore, when the first cylindrical portion 84*q* of the seal pin 84*p* enters the through hole of the first seal plate 81*p*, the through hole of the first seal plate 81*p* is sealed by the seal pin 84*p*. In addition, a through hole having a uniform diameter is also formed in the second seal plate 82*p*. The diameter of this through hole is substantially equal to the diameter of the second cylindrical portion 84*r* of the seal pin 84*p*. Therefore, when the second cylindrical portion 84*r* of the seal pin 84*p* enters the through hole of the second seal plate 82*p*, the through hole of the second seal plate 82*p* is sealed by the seal pin 84*p*. A valve seat having the same structure as the valve seat 83 of each flow passage adjustment valve 80 shown in FIG. 7 to FIG. 12 is used as a valve seat 83*p* provided between the first seal plate 81*p* and the second seal plate 82*p*. Here, the diameter of the through hole of the valve seat 83*p* is larger than the diameter of the first cylindrical portion 84*q* of the seal pin 84*p*. Therefore, the pressure oil can pass through the gap between the outer circumferential surface of the through hole of the valve seat 83*p* and the outer circumferential surface of the first cylindrical portion 84*q* of the seal pin 84*p* and the gap between the outer circumferential surface of the through hole of the valve seat 83*p* and the outer circumferential surface of the second cylindrical portion 84*r* of the seal pin 84*p*.

In the case where such a flow passage adjustment valve 80*a* is used, as shown in FIG. 14, when each reciprocating member 78 is located at the neutral position, the upper end of the second cylindrical portion 85b of each actuation pin 85 is in contact with the pushing portion 78b of each reciprocating member 78. Specifically, the seal plate 87 is pushed and moved in an upward direction shown in FIG. 13 to FIG. 15, by the force of the compressed spring 88 returning to the original state, whereby the seal pin 84p and the actuation pin 85, which are connected to the seal plate 87 via the connection portion 89, are also pushed and moved in the upward direction shown in FIG. 13 to FIG. 15. However, when the upper end of the second cylindrical portion 85b of each actuation pin 85 comes into contact with the pushing portion 78b of each reciprocating member 78, the seal pin 84p and the actuation pin 85 do not move upward more, so that the seal pin 84p is housed in the through hole of the valve seat 83p. In this state, the first seal plate 81p and the second seal plate 82p are not sealed by the seal pin 84p.

Meanwhile, as shown in FIG. 13, when each reciprocating member 78 moves to the advance position, the left reciprocating member 78 moves upward. In this case, in the left flow passage adjustment valve 80a, the seal plate 87 is pushed and moved in the upward direction shown in FIG. 13 to FIG. 15, by the force of the compressed spring 88 returning to the original state, whereby the seal pin 84p and the actuation pin 85, which are connected to the seal plate 87 via the connection portion 89, are also pushed and moved in the upward direction shown in FIG. 13 to FIG. 15. Accordingly, the through hole of the second seal plate 82p is sealed by the second cylindrical portion 84r of the seal pin 84p in the left flow passage adjustment valve 80a. In this state, the first seal plate 81p is not sealed by the seal pin 84p in the left flow passage adjustment valve 80a. In addition, when each reciprocating member 78 moves to the advance position, the right reciprocating member 78 moves downward, whereby the pushing portion 78b of this reciprocating member 78 pushes and moves the second cylindrical portion 85b of the right actuation pin 85 downward. Accordingly, in the right flow passage adjustment valve 80a, the first cylindrical portion 84q of the seal pin 84p enters the through hole of the first seal plate 81p, so that the through hole of the first seal plate 81p is sealed by the seal pin 84p. In this state, the second seal plate 82p is not sealed by the seal pin 84p in the right flow passage adjustment valve 80a.

As shown in FIG. 15, when each reciprocating member 78 moves to the retraction position, the left reciprocating member 78 moves downward, whereby the pushing portion 78b of this reciprocating member 78 pushes and moves the second cylindrical portion 85b of the left actuation pin 85 downward. Accordingly, in the left flow passage adjustment valve 80a, the first cylindrical portion 84q of the seal pin 84p enters the through hole of the first seal plate 81p, so that the through hole of the first seal plate 81p is sealed by the seal pin 84p. In this state, the second seal plate 82p is not sealed by the seal pin 84p in the left flow passage adjustment valve 80a. In addition, when each reciprocating member 78 moves to the retraction position, the right reciprocating member 78 moves upward. In this case, in the right flow passage adjustment valve 80a, the seal plate 87 is pushed and moved in the upward direction shown in FIG. 13 to FIG. 15, by the force of the compressed spring 88 returning to the original state, whereby the seal pin 84p and the actuation pin 85, which are connected to the seal plate 87 via the connection portion 89, are also pushed and moved in the upward direction shown in FIG. 13 to FIG. 15. Accordingly, the through hole of the second seal plate 82p is sealed by the second cylindrical portion 84r of the seal pin 84p in the right flow passage adjustment valve 80a. In this state, the first seal plate 81p is not sealed by the seal pin 84p in the right flow passage adjustment valve 80a.

Even with the pressure oil supply mechanism 30a including the flow passage adjustment valves 80a shown in FIG. 13 to FIG. 15, advance movement and retraction movement of the piston member 52 can be smoothly made by using the respective reciprocating members 78, which are moved in the directions opposite to each other from the neutral position shown in FIG. 14 when the operation handle 70 is rotated, and also by using the pair of flow passage adjustment valves 80a corresponding to the respective reciprocating members 78. To explain in more detail, the pressure oil supply mechanism 30a including the flow passage adjustment valves 80a shown in FIG. 13 to FIG. 15 is configured such that: the cutting part 50 is actuated when the operation handle 70 rotates from the initial position; and the operation of the cutting part 50 is stopped when the operation handle 70 is returned to the initial position by the biasing means. In the case where only one flow passage adjustment valve 80a is provided, the flow passage adjustment valve 80a does not smoothly return to the neutral position, so that the operation of the cutting part 50 does not smoothly stop in some cases. On the other hand, in the case where the pressure oil supply mechanism 30a having the pair of flow passage adjustment valves 80a is used, when the height levels of the pair of flow passage adjustment valves 80a become the same as a result of the height levels of the respective reciprocating members 78 becoming the same, the first seal plate 81p and the second seal plate 82p are not sealed by the seal pin 84p in each of the pair of flow passage adjustment valves 80a. Therefore, the pressure oil sent from the oil chamber 28 to the pressure oil supply mechanism 30a is returned to the oil chamber 28 by the drain pipe 44 as it is, so that the pressure oil is no longer sent from the pressure oil supply mechanism 30a to the advance oil chamber and the retraction oil chamber 58 of the cutting part 50, and the operation of the cutting part 50 can be stopped smoothly.

In the case where the pressure oil supply mechanism 30a having the pair of flow passage adjustment valves 80a shown in FIG. 13 to FIG. 15 is used, the through hole of the first seal plate 81p is sealed by inserting the first cylindrical portion 84q of the seal pin 84p into the through hole of the first seal plate 81p, and the through hole of the second seal plate 82p is sealed by inserting the second cylindrical portion 84r of the seal pin 84p into the through hole of the second seal plate 82p. In this case, the pressure oil may leak between the outer circumferential surface of the through hole of the first seal plate 81p and the outer circumferential surface of the seal pin 84p, or the pressure oil may leak between the outer circumferential surface of the through hole of the second seal plate 82p and the outer circumferential surface of the seal pin 84p. As described above, in the pressure oil supply mechanism 30a shown in FIG. 13 to FIG. 15, there are four locations where the pressure oil may leak, so that the possibility of leakage of the pressure oil is increased as compared to the case where the locations where the pressure oil may leak are two locations (specifically, the two first seal plates 81) as in the pressure oil supply mechanism 30 shown in FIG. 7 to FIG. 9.

Next, a pressure oil supply mechanism according to the conventional art will be described with reference to FIG. 16. In the description of the pressure oil supply mechanism according to the conventional art shown in FIG. 16, components that are the same as those of the cutting device 10 shown in FIG. 1 to FIG. 3 are designated by the same reference characters, and the description thereof is omitted.

Figure 16:
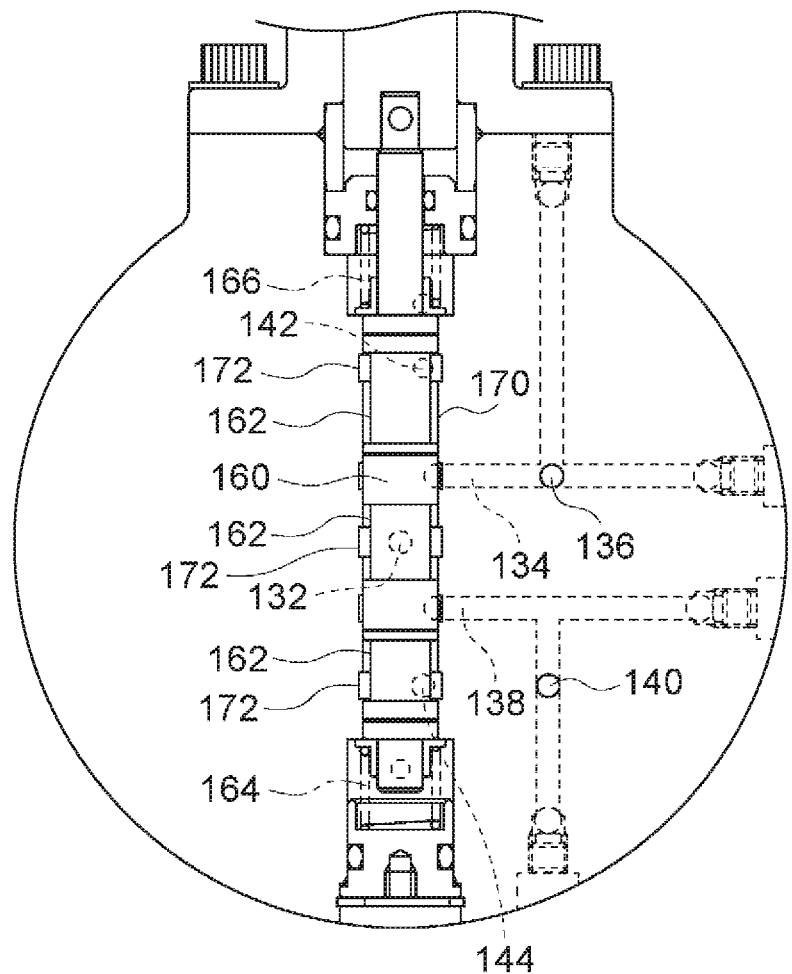
FIG. 16 is a structural diagram showing the structure of a pressure oil supply mechanism of a conventional cutting device.

The pressure oil supply mechanism shown in FIG. 16 has one elongated spool valve 160 which has a substantially cylindrical shape, and a hole 170 which has a substantially circular cross section and in which the spool valve 160 is housed. Here, the diameter of the spool valve 160 and the diameter of the hole 170 are equal to each other. Accordingly, the pressure oil does not pass between the outer circumferential surface of the spool valve 160 and the outer circumferential surface of the hole 170. In addition, a spring 164 is provided at one end portion of the spool valve 160, and a spring 166 is also provided at another end portion of the spool valve 160. Such a spool valve 160 is movable in an up-down direction in FIG. 16. Specifically, when the operator operates an operation handle (not shown), the spool valve 160 moves upward or downward from a neutral position in FIG. 16. In addition, after the spool valve 160 moves upward or downward from the neutral position shown in FIG. 16, when the external force is no longer applied to the spool valve 160, the spool valve 160 returns to the original position, that is, the neutral position, by the force of the compressed spring 164 or spring 166 returning to the original state.

In FIG. 16, a first oil passage 132 is provided so as to face the hole 170, and communicates with the oil chamber 28. In addition, a second oil passage 134 is provided such that one end thereof faces the hole 170. When the spool valve 160 is located at the neutral position, the second oil passage 134 faces the outer circumferential surface of the spool valve 160. In addition, the second oil passage 134 communicates with a third oil passage 136, and the third oil passage 136 communicates with the advance oil chamber of the cutting part 50. Moreover, a fourth oil passage 138 is provided such that one end thereof faces the hole 170. When the spool valve 160 is located at the neutral position, the fourth oil passage 138 faces the outer circumferential surface of the spool valve 160. In addition, the fourth oil passage 138 communicates with a fifth oil passage 140, and the fifth oil passage 140 communicates with the retraction oil chamber 58 of the cutting part 50. Moreover, two drain pipes 142 and 144 are formed so as to face the hole 170, and the pressure oil is returned to the oil chamber 28 by the respective drain pipes 142 and 144.

A groove 162 is formed on a part of the outer circumferential surface of the spool valve 160. In addition, a groove 172 is also formed on the outer circumferential surface of the hole 170. The pressure oil can pass through the grooves 162 and 172 between the outer circumferential surface of the spool valve 160 and the outer circumferential surface of the hole 170.

When the spool valve 160 is located at the neutral position as shown in FIG. 16, an end portion of the second oil passage 134 and an end portion of the fourth oil passage 138 face the outer circumferential surface of the spool valve 160, so that the first oil passage 132 and the second oil passage 134 do not communicate with each other. In addition, the first oil passage 132 and the fourth oil passage 138 do not communicate with each other. Accordingly, the pressure oil is no longer sent from the oil chamber 28 to the advance oil chamber and the retraction oil chamber 58 of the cutting part 50, and the division member 54 does not move, so that the cutting part 50 does not operate. In addition, when the spool valve 160 moves upward from the neutral position in FIG. 16 by the operator operating the operation handle, the end portion of the second oil passage 134 and the end portion of the fourth oil passage 138 face the groove 162 which is formed on the outer circumferential surface of the spool valve 160. Accordingly, the first oil passage 132 and the second oil passage 134 communicate with each other, so that the pressure oil is sent from the oil chamber 28 via the first oil passage 132, the second oil passage 134, and the third oil passage 136 to the advance oil chamber of the cutting part 50. As a result, the division member 54 and the piston member 52 move integrally in the leftward direction in FIG. 1 and FIG. 2, so that, in the cutting part 50, the respective cutting members 64 and 66 rotate about the shaft 68 in the directions in which the cutting members 64 and 66 approach each other. In addition, at this time, the return oil is sent from the retraction oil chamber 58 of the cutting part 50 to the fifth oil passage 140, and returned from the fifth oil passage 140 via the fourth oil passage 138 to the oil chamber 28 by the drain pipe 144.

When the spool valve 160 moves downward from the neutral position in FIG. 16 by the operator operating the operation handle, the end portion of the second oil passage 134 and the end portion of the fourth oil passage 138 face the groove 162 which is formed on the outer circumferential surface of the spool valve 160. Accordingly, the first oil passage 132 and the fourth oil passage 138 communicate with each other, so that the pressure oil is sent from the oil chamber 28 via the first oil passage 132, the fourth oil passage 138, and the fifth oil passage 140 to the retraction oil chamber 58 of the cutting part 50. As a result, the division member 54 and the piston member 52 move integrally in the rightward direction in FIG. 1 and FIG. 2, so that, in the cutting part 50, the respective cutting members 64 and 66 rotate about the shaft 68 in the directions in which the cutting members 64 and 66 move away from each other. In addition, at this time, the return oil is sent from the advance oil chamber of the cutting part 50 to the third oil passage 136, and returned from the third oil passage 136 via the second oil passage 134 to the oil chamber 28 by the drain pipe 142.

The pressure oil supply mechanism including such a spool valve 160 shown in FIG. 16 is configured such that: the tool is actuated by the actuation part 21 when the operation handle 70 rotates from the initial position; and the operation of the tool by the actuation part 21 is stopped when the operation handle 70 is returned to the initial position by the biasing means. Here, the one spool valve 160 is merely provided, and this spool valve 160 returns to the original position, that is, the neutral position, by the force of the compressed spring 164 or spring 166 returning to the original state. However, with such a structure, when a large force is applied to the respective cutting members 64 and 66 of the cutting part 50, the piston member 52 or the body portion 56 becomes deformed by this load, and in this case, extra lateral pressure is applied to the spool valve 160. At this time, when the operation handle 70 is released from a hand, the spool valve 160 does not return to the original position, that is, the neutral position, by the spring 164 or the spring 166, so that the operation of the cutting part 50 does not smoothly stop in some cases. On the other hand, in the case where the pair of flow passage adjustment valves 80 or the pair of flow passage adjustment valves 80a are used as described above, occurrence of such a problem can be suppressed.

The hydraulic actuation device according to the present invention is not limited to the above-described structures, and various modifications can be made thereto.

For example, the tool actuated by the actuation part 21 is not limited to the cutting part 50. As the tool, for example, a spreader for prying open a gap of an object such as a door, or the like, may be used.

The invention claimed is:

1. A hydraulic actuation device comprising:
a tool;
an actuation part having a pressure oil supply mechanism configured to send a pressure oil from an oil chamber to the tool and return a return oil from the tool to the oil chamber;
an operation handle for adjusting oil passages for the pressure oil and the return oil in the pressure oil supply mechanism, the operation handle being configured to be able to be moved from an initial position;
a biaser configured to bias the operation handle toward the initial position when no external force is applied to the operation handle; and
a pair of reciprocators, wherein
when the operation handle moves from the initial position, the tool is actuated by the actuation part,
when the operation handle is returned to the initial position by the biaser, operation of the tool by the actuation part is stopped,
the tool has a tool member, a division member configured to divide an internal space in which the pressure oil is stored, into an advance oil chamber and a retraction oil chamber, and a piston member attached to the division member and configured to move the tool member,
when the operation handle moves from the initial position, the pressure oil is sent by the actuation part from the oil chamber to the advance oil chamber or the retraction oil chamber of the tool, whereby the division member and the piston member move, and at this time, the return oil is returned from the retraction oil chamber or the advance oil chamber to the oil chamber,
the operation handle is configured to be able to be rotated in a first rotation direction and a second rotation direction opposite to the first rotation direction, from the initial position,
when the operation handle rotates in the first rotation direction from the initial position, the tool member of the tool moves in a first direction by the actuation part,
when the operation handle rotates in the second rotation direction from the initial position, the tool member of the tool moves in a second direction opposite to the first direction, by the actuation part,
the reciprocators are configured to be moved in directions opposite to each other from the neutral position when the operation handle is rotated,
the pressure oil supply mechanism has a pair of flow passage adjustment valves corresponding to the pair of reciprocators, and the oil passage for the pressure oil from the oil chamber to the tool and the oil passage for the return oil from the tool to the oil chamber are adjusted by the flow passage adjustment valves,
when the reciprocators are moved in the directions opposite to each other from the neutral position by rotation of the operation handle in the first rotation direction from the initial position, the oil passage for the pressure oil leads from the oil chamber to the advance oil chamber of the tool and the oil passage for the return oil leads from the retraction oil chamber of the tool to the oil chamber, whereby the division member and the piston member move in a first direction, and
when the reciprocators are moved in the directions opposite to each other from the neutral position by rotation of the operation handle in the second rotation direction from the initial position, the oil passage for the pressure oil leads from the oil chamber to the retraction oil chamber of the tool and the oil passage for the return oil leads from the advance oil chamber of the tool to the oil chamber, whereby the division member and the piston member move in a second direction opposite to the first direction.

2. The hydraulic actuation device according to claim 1, wherein
the flow passage adjustment valves each have a first seal plate provided with a through hole, a second seal plate provided with a through hole, and a seal pin for sealing the through hole of the first seal plate or the through hole of the second seal plate, and the seal pin is configured to be moved by the reciprocators,
when each of the reciprocators is located at the neutral position, the through hole of the first seal plate and the through hole of the second seal plate are not sealed by the seal pin, and
when each of the reciprocators moves from the neutral position, the through hole of the first seal plate is sealed by the seal pin in one of the flow passage adjustment valves, and the through hole of the second seal plate is sealed by the seal pin in another of the flow passage adjustment valves.

3. The hydraulic actuation device according to claim 2, wherein the seal plate sealed by the seal pin in each of the flow passage adjustment valves is different between when the operation handle rotates in the first rotation direction from the initial position and when the operation handle rotates in the second rotation direction from the initial position.

4. The hydraulic actuation device according to claim 3, wherein
the seal pin has a cylindrical portion and a spherical end surface provided at one end portion of the cylindrical portion,
a diameter of the through hole of the first seal plate is equal to a diameter of the cylindrical portion of the seal pin, and the through hole of the first seal plate is sealed by inserting the seal pin into the through hole of the first seal plate, and
a first through hole having a diameter smaller than the diameter of the cylindrical portion of the seal pin and a second through hole having a diameter larger than the diameter of the cylindrical portion of the seal pin are formed in the second seal plate, and the first through hole and the second through hole of the second seal plate are sealed by the spherical end surface coming into contact with a portion between the first through hole and the second through hole when the cylindrical portion of the seal pin enters the second through hole of the second seal plate.

5. The hydraulic actuation device according to claim 2, wherein
the seal pin has a cylindrical portion and a spherical end surface provided at one end portion of the cylindrical portion,
a diameter of the through hole of the first seal plate is equal to a diameter of the cylindrical portion of the seal pin, and the through hole of the first seal plate is sealed by inserting the seal pin into the through hole of the first seal plate, and
a first through hole having a diameter smaller than the diameter of the cylindrical portion of the seal pin and a second through hole having a diameter larger than the diameter of the cylindrical portion of the seal pin are formed in the second seal plate, and the first through hole and the second through hole of the second seal plate are sealed by the spherical end surface coming into contact with a portion between the first through hole and the second through hole when the cylindrical portion of the seal pin enters the second through hole of the second seal plate.

6. The hydraulic actuation device according to claim 5, wherein an inclined surface is formed between the first through hole and the second through hole in the second seal plate, and the first through hole and the second through hole of the second seal plate are sealed by the spherical end surface coming into contact with the inclined surface when the cylindrical portion of the seal pin enters the second through hole of the second seal plate.

\* \* \* \* \*